US012183148B2

(12) United States Patent
Acres

(10) Patent No.: US 12,183,148 B2
(45) Date of Patent: *Dec. 31, 2024

(54) PERSONAL ELECTRONIC DEVICE FOR GAMING AND BONUS SYSTEM

(71) Applicant: Acres Technology, Las Vegas, NV (US)

(72) Inventor: John F. Acres, Las Vegas, NV (US)

(73) Assignee: Acres Technology, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/326,526

(22) Filed: May 31, 2023

(65) Prior Publication Data

US 2024/0062614 A1 Feb. 22, 2024

Related U.S. Application Data

(63) Continuation of application No. 17/366,298, filed on Jul. 2, 2021, now Pat. No. 11,704,963, which is a continuation of application No. 16/701,476, filed on Dec. 3, 2019, now Pat. No. 11,069,180, which is a continuation of application No. 15/376,040, filed on Dec. 12, 2016, now Pat. No. 10,529,171, which is a
(Continued)

(51) Int. Cl.
*G07F 17/32* (2006.01)
*G07F 17/34* (2006.01)

(52) U.S. Cl.
CPC ...... *G07F 17/3213* (2013.01); *G07F 17/3218* (2013.01); *G07F 17/3223* (2013.01); *G07F 17/323* (2013.01); *G07F 17/3244* (2013.01); *G07F 17/3267* (2013.01); *G07F 17/3293* (2013.01); *G07F 17/34* (2013.01); *G07F 17/3211* (2013.01)

(58) Field of Classification Search
CPC ............. G07F 17/2393; G07F 17/3244; G07F 17/3267; G07F 17/3211; G07F 17/323
See application file for complete search history.

(56) References Cited

U.S. PATENT DOCUMENTS 4,687,206 A 8/1987 Cordry et al.
5,231,568 A 7/1993 Cohen et al.
(Continued)

FOREIGN PATENT DOCUMENTS

WO 0233576 A1 4/2002
WO 2007067975 A2 6/2007
WO 2009134257 A1 11/2009

OTHER PUBLICATIONS

U.S. Appl. No. 17/366,298 (U.S. Pat. No. 2021/0335089), filed Jul. 2, 2021 (Oct. 28, 2021), John F. Acres (Acres Technology).
(Continued)

*Primary Examiner* — Thomas H Henry
(74) *Attorney, Agent, or Firm* — Ballard Spahr LLP

(57) ABSTRACT

Embodiments of the present invention are directed to communication methods in gaming networks using portable devices. In some networks portable devices communicate information about the status of particular gaming machines on the gaming network. In other networks portable devices are used as a secondary display for the gaming device. In yet other networks bonus games may be played on the portable devices. Further embodiments include a portable device that operates to match a current state of a game to a pre-defined state or states.

20 Claims, 13 Drawing Sheets

Related U.S. Application Data continuation of application No. 15/012,484, filed on Feb. 1, 2016, now Pat. No. 9,542,798, which is a continuation of application No. 14/470,639, filed on Aug. 27, 2014, now Pat. No. 9,275,513, which is a continuation of application No. 12/716,188, filed on Mar. 2, 2010, now abandoned, which is a continuation-in-part of application No. 12/713,090, filed on Feb. 25, 2010, now abandoned.

(56) References Cited

U.S. PATENT DOCUMENTS

| | | | |
|---|---|---|---|
| 5,373,440 | A | 12/1994 | Cohen et al. |
| 5,401,023 | A | 3/1995 | Wood |
| 5,511,781 | A | 4/1996 | Wood et al. |
| 5,736,982 | A | 4/1998 | Suzuki et al. |
| 5,788,574 | A | 8/1998 | Ornstein et al. |
| 5,810,361 | A | 9/1998 | Kadlic |
| 5,882,258 | A | 3/1999 | Kelly et al. |
| 6,016,338 | A | 1/2000 | Bansal et al. |
| 6,135,884 | A | 10/2000 | Hedrick et al. |
| 6,176,781 | B1 | 1/2001 | Walker et al. |
| 6,179,710 | B1 | 1/2001 | Sawyer et al. |
| 6,311,214 | B1 | 10/2001 | Rhoads |
| 6,315,666 | B1 | 11/2001 | Mastera et al. |
| 6,371,851 | B1 | 4/2002 | Singer et al. |
| 6,379,245 | B2 | 4/2002 | De Keller |
| 6,651,984 | B1 | 11/2003 | Luken |
| 6,726,563 | B1 | 4/2004 | Baerlocher et al. |
| 6,942,565 | B2 | 9/2005 | Karn et al. |
| 7,090,576 | B2 | 8/2006 | Herbrich et al. |
| 7,169,052 | B2 | 1/2007 | Beaulieu et al. |
| 7,275,990 | B2 | 10/2007 | Walker et al. |
| 7,335,106 | B2 | 2/2008 | Johnson |
| 7,384,338 | B2 | 6/2008 | Rothschild et al. |
| 7,785,183 | B1 | 8/2010 | Stockham et al. |
| 9,286,761 | B2 | 3/2016 | Acres |
| 9,524,612 | B2 | 12/2016 | Acres |
| 9,767,653 | B2 | 9/2017 | Acres |
| 9,922,499 | B2 | 3/2018 | Acres |
| 10,388,114 | B2 | 8/2019 | Acres |
| 10,650,640 | B2 | 5/2020 | Acres |
| 10,937,276 | B2 | 3/2021 | Acres |
| 11,645,891 | B2 | 5/2023 | Acres |
| 2002/0082065 | A1 | 6/2002 | Fogel et al. |
| 2002/0082077 | A1 | 6/2002 | Johnson et al. |
| 2002/0155873 | A1 | 10/2002 | Berman et al. |
| 2003/0069063 | A1 | 4/2003 | Bilyeu et al. |
| 2003/0073496 | A1 | 4/2003 | D'Amico et al. |
| 2003/0104854 | A1 | 6/2003 | Cannon |
| 2003/0114219 | A1 | 6/2003 | McClintic |
| 2003/0119579 | A1 | 6/2003 | Walker et al. |
| 2003/0190943 | A1 | 10/2003 | Walker et al. |
| 2003/0230848 | A1 | 12/2003 | Mellerowicz |
| 2004/0005919 | A1 | 1/2004 | Walker et al. |
| 2004/0023709 | A1 | 2/2004 | Beaulieu et al. |
| 2004/0033826 | A1 | 2/2004 | Berman |
| 2004/0064504 | A1 | 4/2004 | Domschitz |
| 2004/0116170 | A1 | 6/2004 | Walker et al. |
| 2004/0162134 | A1 | 8/2004 | Walker et al. |
| 2004/0188938 | A1 | 9/2004 | Moody et al. |
| 2004/0204246 | A1 | 10/2004 | Halliburton et al. |
| 2004/0229700 | A1 | 11/2004 | Cannon et al. |
| 2005/0003890 | A1 | 1/2005 | Hedrick et al. |
| 2005/0009608 | A1 | 1/2005 | Robarts et al. |
| 2005/0035551 | A1 | 2/2005 | Weigl et al. |
| 2005/0059452 | A1 | 3/2005 | Hartl |
| 2005/0079908 | A1 | 4/2005 | Pacey |
| 2005/0137015 | A1 | 6/2005 | Rogers et al. |
| 2005/0143174 | A1 | 6/2005 | Goldman et al. |
| 2005/0173863 | A1 | 8/2005 | Walker et al. |
| 2005/0216529 | A1 | 9/2005 | Ashtekar et al. |
| 2005/0223328 | A1 | 10/2005 | Ashtekar et al. |
| 2005/0248574 | A1 | 11/2005 | Ashtekar et al. |
| 2005/0261058 | A1 | 11/2005 | Nguyen et al. |
| 2006/0009285 | A1 | 1/2006 | Pryzby et al. |
| 2006/0030397 | A1 | 2/2006 | Chan |
| 2006/0033275 | A1 | 2/2006 | Trass et al. |
| 2006/0063587 | A1 | 3/2006 | Manzo |
| 2006/0073879 | A1 | 4/2006 | Baerlocher |
| 2006/0079309 | A1 | 4/2006 | Walker et al. |
| 2006/0089191 | A1 | 4/2006 | Singer et al. |
| 2006/0128460 | A1 | 6/2006 | Muir et al. |
| 2006/0148549 | A1 | 7/2006 | Walker et al. |
| 2006/0189382 | A1 | 8/2006 | Muir et al. |
| 2006/0211489 | A1 | 9/2006 | Walker et al. |
| 2006/0211493 | A1 | 9/2006 | Walker et al. |
| 2006/0211496 | A1 | 9/2006 | Manz |
| 2006/0211497 | A1 | 9/2006 | Manz |
| 2006/0217187 | A1 | 9/2006 | Walker et al. |
| 2006/0217188 | A1 | 9/2006 | Walker et al. |
| 2006/0217194 | A1 | 9/2006 | Walker et al. |
| 2006/0226598 | A1 | 10/2006 | Walker et al. |
| 2006/0226599 | A1 | 10/2006 | Walker et al. |
| 2006/0229124 | A1 | 10/2006 | Walker et al. |
| 2006/0248025 | A1 | 11/2006 | Walker et al. |
| 2006/0252512 | A1 | 11/2006 | Walker et al. |
| 2006/0258434 | A1 | 11/2006 | Jaffe et al. |
| 2006/0264254 | A1 | 11/2006 | Aoki |
| 2006/0287034 | A1 | 12/2006 | Englman et al. |
| 2006/0287040 | A1 | 12/2006 | Walker et al. |
| 2007/0015564 | A1 | 1/2007 | Walker et al. |
| 2007/0032287 | A1 | 2/2007 | Osawa |
| 2007/0057468 | A1 | 3/2007 | Bruner, Jr. |
| 2007/0093297 | A1 | 4/2007 | Moshal |
| 2007/0135214 | A1 | 6/2007 | Walker et al. |
| 2007/0135215 | A1 | 6/2007 | Walker et al. |
| 2007/0142107 | A1 | 6/2007 | Kuhn et al. |
| 2007/0167235 | A1 | 7/2007 | Naicker |
| 2007/0203971 | A1 | 8/2007 | Walker et al. |
| 2007/0207846 | A1 | 9/2007 | Burak et al. |
| 2007/0287523 | A1 | 12/2007 | Esses et al. |
| 2007/0293315 | A1 | 12/2007 | Mizuta |
| 2008/0026816 | A1 | 1/2008 | Sammon et al. |
| 2008/0039174 | A1 | 2/2008 | Litman |
| 2008/0054560 | A1 | 3/2008 | Presley et al. |
| 2008/0058052 | A1 | 3/2008 | Schwartz et al. |
| 2008/0064491 | A1 | 3/2008 | Taylor |
| 2008/0125212 | A1 | 5/2008 | Schofield |
| 2008/0171585 | A1 | 7/2008 | Jackson |
| 2008/0200245 | A1 | 8/2008 | Trobia |
| 2008/0248870 | A1 | 10/2008 | Kato et al. |
| 2008/0311981 | A1 | 12/2008 | Schugar |
| 2009/0054134 | A1 | 2/2009 | Jackson |
| 2009/0075722 | A1 | 3/2009 | Louie et al. |
| 2009/0082101 | A1 | 3/2009 | Ostergren et al. |
| 2009/0093290 | A1 | 4/2009 | Lutnick et al. |
| 2009/0117989 | A1 | 5/2009 | Arezina et al. |
| 2009/0170593 | A1 | 7/2009 | Pacey |
| 2009/0191962 | A1 | 7/2009 | Hardy et al. |
| 2009/0197684 | A1 | 8/2009 | Arezina et al. |
| 2009/0275375 | A1 | 11/2009 | Acres |
| 2010/0035678 | A1 | 2/2010 | Antoniades |
| 2010/0113143 | A1 | 5/2010 | Gagner et al. |
| 2010/0248806 | A1 | 9/2010 | Englman et al. |
| 2010/0311499 | A1 | 12/2010 | Tarantino |
| 2010/0314823 | A1 | 12/2010 | Terao et al. |
| 2011/0014975 | A1 | 1/2011 | Grabiec et al. |
| 2011/0207529 | A1 | 8/2011 | Acres |
| 2017/0069171 | A1 | 3/2017 | Acres |
| 2017/0092051 | A1 | 3/2017 | Acres |
| 2017/0352232 | A1 | 12/2017 | Acres |
| 2018/0158284 | A1 | 6/2018 | Acres |
| 2019/0333336 | A1 | 10/2019 | Acres |
| 2020/0105093 | A1 | 4/2020 | Acres |
| 2020/0242893 | A1 | 7/2020 | Acres |
| 2021/0174644 | A1 | 6/2021 | Acres |

OTHER PUBLICATIONS

U.S. Appl. No. 16/701,476 (U.S. Pat. No. 11,069,180), filed Dec. 3, 2019 (Jul. 20, 2021), John F. Acres (Acres Technology).

U.S. Appl. No. 15/376,040 (U.S. Pat. No. 10,529,171), filed Dec. 12, 2016 (Jan. 7, 2020), John F. Acres (Acres Technology).

(56) References Cited

OTHER PUBLICATIONS

U.S. Appl. No. 15/012,484 (U.S. Pat. No. 9,542,798), filed Feb. 1, 2016 (Jan. 10, 2017), John F. Acres (Acres Technology).
U.S. Appl. No. 14/470,639 (U.S. Pat. No. 9,275,513), filed Aug. 27, 2014 (Mar. 1, 2016), John F. Acres (Acres Technology).
U.S. Appl. No. 12/716,188 (U.S. Pat. No. 2011/0207529), filed Mar. 2, 2010 (Aug. 25, 2011), John F. Acres (Acres Technology).
U.S. Appl. No. 12/713,090, filed Feb. 25, 2010, John F. Acres (Acres Technology).
Avatar, Free Merriam-Webster Dictionary [Online] Retrieved Aug. 2, 2011. Retrieved from the intemet: <http://www.merriam-webster.com/dictionary/avatar>.
Game Makers Unveil Groundbreaking New Games and Systems, G2E Convention Coverage, Dec. 2007, pp. 12-47, Indian Gaming.
U.S. Appl. No. 18/194,946, filed Apr. 3, 2023, John F. Acres (Acres Technology).

PERSONAL ELECTRONIC DEVICE FOR GAMING AND BONUS SYSTEM

CROSS REFERENCE TO RELATED PATENT APPLICATIONS

This application is a Continuation of U.S. application Ser. No. 17/366,298 filed Jul. 2, 2021, which is a Continuation of U.S. application Ser. No. 16/701,476 filed Dec. 3, 2019, now U.S. Pat. No. 11,069,180 issued Jul. 20, 2021, which is a Continuation of U.S. application Ser. No. 15/376,040 filed Dec. 12, 2016, now U.S. Pat. No. 10,529,171 issued Jan. 7, 2020, which is Continuation of U.S. application Ser. No. 15/012,484, filed Feb. 1, 2016, now U.S. Pat. No. 9,542,798 issued Jan. 10, 2017, which is a Continuation of U.S. application Ser. No. 14/470,639, filed Aug. 27, 2014, now U.S. Pat. No. 9,275,513, issued Mar. 1, 2016, entitled PERSONAL ELECTRONIC DEVICE FOR GAMING AND BONUS SYSTEM, and Continuation of U.S. application Ser. No. 12/716,188, filed Mar. 2, 2010 entitled PERSONAL ELECTRONIC DEVICE FOR GAMING AND BONUS SYSTEM, now abandoned, and Continuation-In-Part of U.S. application Ser. No. 12/713,090, filed Feb. 25, 2010, entitled PERSONAL ELECTRONIC DEVICE FOR GAMING AND BONUS SYSTEM, now abandoned.

This application is related to U.S. application Ser. No. 12/713,085, filed Feb. 25, 2010, entitled SYSTEM FOR TRADE-IN BONUS and Ser. No. 12/716,181, filed Mar. 2, 2010, now U.S. Pat. No. 9,286,761, issued on Mar. 15, 2016, entitled SYSTEM FOR TRADE-IN BONUS, and U.S. patent application Ser. No. 15/013,264, filed Feb. 2, 2016, now U.S. Pat. No. 9,524,612, issued on Dec. 20, 2016, entitled SYSTEM FOR TRADE-IN BONUS, the contents of all of which are hereby incorporated by reference.

FIELD OF THE INVENTION

This disclosure relates generally to gaming systems, and more particularly to efficient and convenient ways of sending information to players about current status of gaming systems.

BACKGROUND

Recreational gamblers often gamble more often when enticements such as bonuses, gambling games, discounts, and preferential treatment are afforded them. Gamblers are further enticed by rewards for loyalty, personal recognition and access to information they perceive as providing an advantage or edge in their gambling activities. Often, gamblers feel a heightened sense of advantage when they are given access to information, services and opportunities not readily available to others.

Casinos have long known that gambles desire such information and enticements. The challenge of providing information, services and enticements gamblers desire is made difficult by the lack of efficient communication channels. Today's casinos have only limited tools of communication, such as newsletters, websites, floor personnel, signage and information presented on the games themselves. Modern gambling machines are already equipped with a wide range of information displays and it can be difficult to communicate a specific proposition to gamblers amid all the general messages already displayed.

Further, the information desired by one gambler may well be considered clutter by another gambler.

Embodiments of the invention address these and other limitations in the prior art.

DETAILED DESCRIPTION

Figure 1:
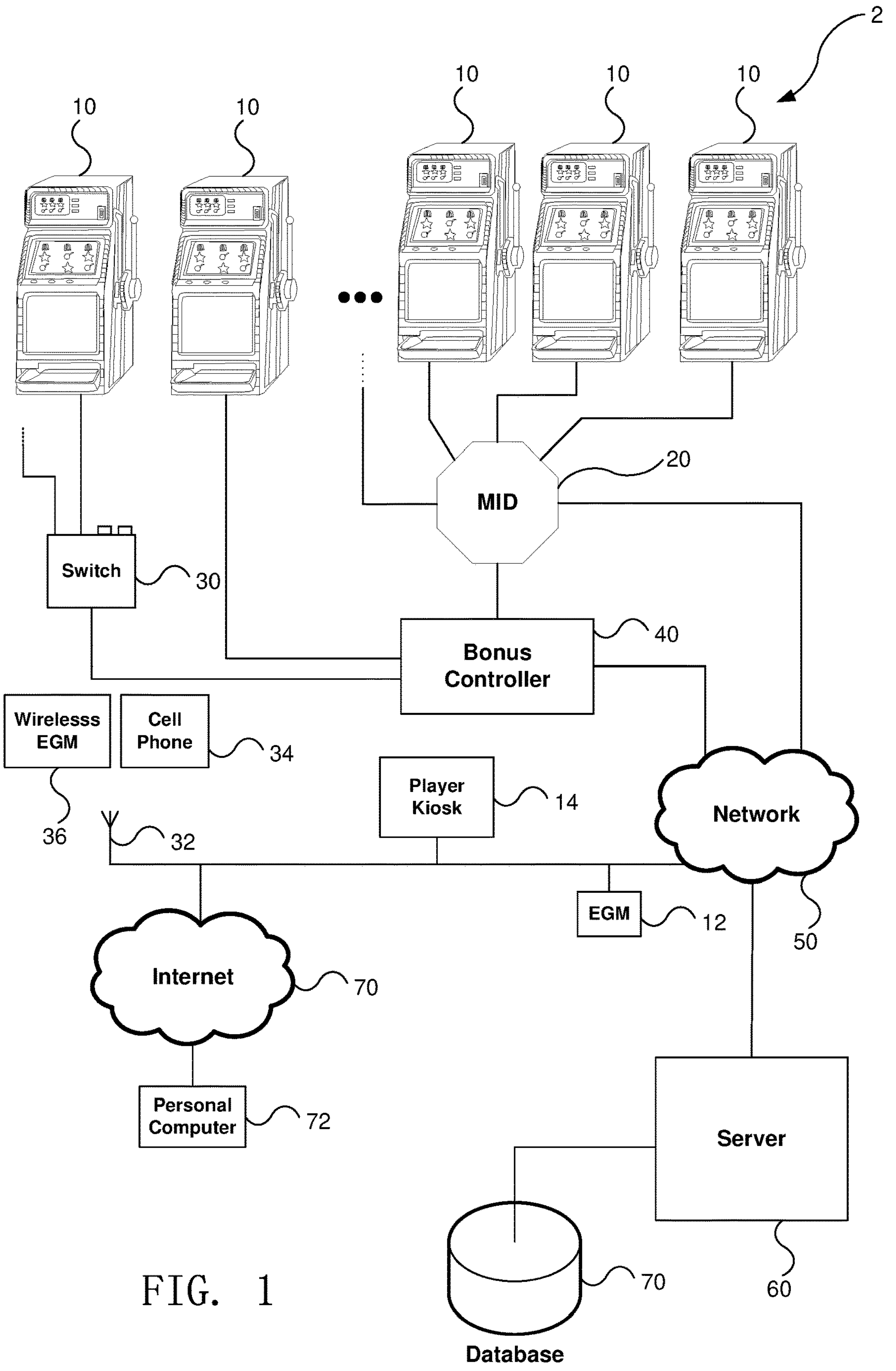
FIG. 1 is a system diagram illustrating various components of a gaming system according to embodiments of the invention.

FIG. 1 is a system diagram illustrating various components of a gaming system according to embodiments of the invention. Referring to FIG. 1, the gaming system 2 includes several gaming devices, also referred to as Electronic Gaming Machines (EGMs) 10 that are connected to a gaming network 50 through various communication mechanisms.

In general, a gaming network 50 connects any of a number of EGMs 10, or other gaming devices, such as those described below, for central management. Accounting and other functions may be served by a connected server 60 and database 70. For example many player tracking functions, bonusing systems, and promotional systems may be centrally administrated from the server 60 and database 70. In some embodiments there may be multiple servers 60 and databases 70, each performing different functions. In other embodiments functions may be combined and operate on a single or small group of servers 60, each with their own database 70 or combined databases.

Many of the EGMs 10 of FIG. 1 connect to the gaming network 50 through a Machine Interface Device, MID 20. In general, the MID 20 is a multi-protocol interface that monitors communication between the gaming network 50 and the EGM 10. In a common embodiment, the MID 20 communicates to the EGM 10 through a standard gaming network port, using a standard gaming network protocol, SAS, which is well known in the gaming industry. Most modern games include at least one communication port, which is commonly a SAS port or a port for another communication protocol. The MID 20, along with its various functions and communication methods is described in detail with reference to FIGS. 3A and 3B below.

Other EGMs 10 in FIG. 1 connect to the gaming network 50 through a bonus controller 40, which may be coupled between the gaming network 50 and gaming device 10. The bonus controller 40 generally communicates through a non-SAS protocol, such as another well-known communication protocol known as GSA. GSA is typically carried over an Ethernet network, and thus the bonus controller 40 includes an Ethernet transceiver, which is described with reference to FIG. 4 below. Because the bonus controller 40 communication may be Ethernet based, a switch 30 may be used to extend the number of devices that may be coupled to the bonus controller 40. The bonus controller 40 and/or the MID 20 may create or convert data or information received according to a particular protocol, such as SAS, into data or information according to another protocol, such as GSA. In this way the MID 20 and bonus controller 40 are equipped to communicate, seamlessly, between any EGM 10 and gaming network 50 no matter which communication protocols are in use. Further, because the MID 20 and bonus controller 40 are programmable, and include multiple extensible communication methods, as described below, they are capable of communicating with EGMs 10 that will communicate using protocols and communication methods developed in the future.

Other games or devices on which games may be played are connected to the gaming network using other connection and/or communication methods. For instance, an EGM 12 may couple directly to the network 50 without any intervening hardware, other than hardware that is built into the EGM 12 to connect it to the network 50. Likewise, a player kiosk 14 may be directly coupled to the gaming network. The player kiosk 14 allows players, managers, or other personnel to access data on the gaming network 50, such as a player tracking record, and/or to perform other functions using the network. For example, a player may be able to check the current holdings of the player account, transfer balances, redeem player points for credits, cash, or other merchandise or coupons, such as food or travel coupons, for instance.

A wireless transceiver 32 couples the gaming network 50 to a wireless EGM 36, such as a handheld device, or, through a cell phone or other compatible data network, the transceiver 32 connects to a cellular phone 34. The cellular phone 34 may be a "smart phone," which in essence is a handheld computer capable of playing games or performing other functions on the gaming network 50, as described in some embodiments of the invention.

The gaming network 50 also couples to the internet 70, which in turn is coupled to a number of computers, such as the personal computer 72 illustrated in FIG. 1. The personal computer 72 may be used much like the kiosk 14, described above, to manage player tracking or other data kept on the gaming network 50. More likely, though, is that the personal computer 72 is used to play actual games in communication with the gaming network 50. Player data related to games and other functions performed on the personal computer 72 may be tracked as if the player were playing on an EGM 10.

In general, in operation, a player inserts a starting credit into one of the games, such as an EGM 10. The EGM 10 sends data through its SAS or other data communication port through the MID 20 and/or bonus controller 50 to the gaming network 50. Various servers 60 and databases 70 collect information about the gameplay on the EGM 10, such as wagers made, results, various pressing of the buttons on the EGM 10, for example. In addition, the SAS port on the EGM 10 may also be coupled, through the MID 20 as described below, to other systems, such as player tracking systems, accounting, and ticketing systems, such as Ticket-In-Ticket-Out (TITO) systems.

In addition, the EGM 10 accepts information from systems external to the EGM itself to cause the EGM 10 to perform other functions. For example, these external systems may drive the EGM 10 to issue additional credits to the player. In another example, a promotional server may direct the EGM 10 to print a promotional coupon on the ticket printer of the EGM.

The bonus controller 40 is structured to perform some of the above-described functions as well. For example, in addition to standard games on the EGM 10, the bonus controller 40 is structured to drive the EGM 10 to pay bonus awards to the player based on any of the factors, or combination of factors, related to the EGM 10, the player playing the EGM 10, particular game outcomes of the game being played, or other factors.

In this manner, the combination of the bonus controller 40 and MID 20 are a sub-system capable of interfacing with each of the EGMs on a gaming network 50. Through this interface, the MID 20 may gather data about the game, gameplay, or player, or other data on the EGM 10, and forward it to the bonus controller 40. The bonus controller 40 then uses such collected data as input and, when certain conditions are met, sends information and/or data to the EGM 10 to cause it to perform certain functions.

In a more detailed example, suppose a player is playing an EGM 10 coupled to the MID 20 and the bonus controller 40 described above. The player inserts a player tracking card so the gaming network 50 knows the player identity. The MID 20 also stores such identifying information, or perhaps stores only information that the player is a level-2 identified player, for instance. The MID 20 passes such information to the bonus controller 40, which has been programmed to provide a welcome-back bonus to any level-2 player after he or she has played two games. Gameplay on the EGM 10 continues and, after the player plays two games, the bonus controller 40 instructs the EGM 10 to add an additional 40 credits to the EGM 10 as the welcome-back bonus. Such monitoring and control of the EGM 10 can occur in conjunction with, but completely separate from any player tracking or bonusing function that is already present on the gaming network 50. In other words, the server 60, when structured at least in part as a bonusing server, may be set to provide a time-based bonus of 10 credits for every hour played by the player of the EGM 10. The above-described welcome-back bonus may be managed completely separately through the bonus controller 40 and MID 20. Further, all of the actions on the EGM 10 caused by the bonus controller 40 are also communicated to the standard accounting, tracking, and other systems already present on the gaming network 50.

Figure 2:
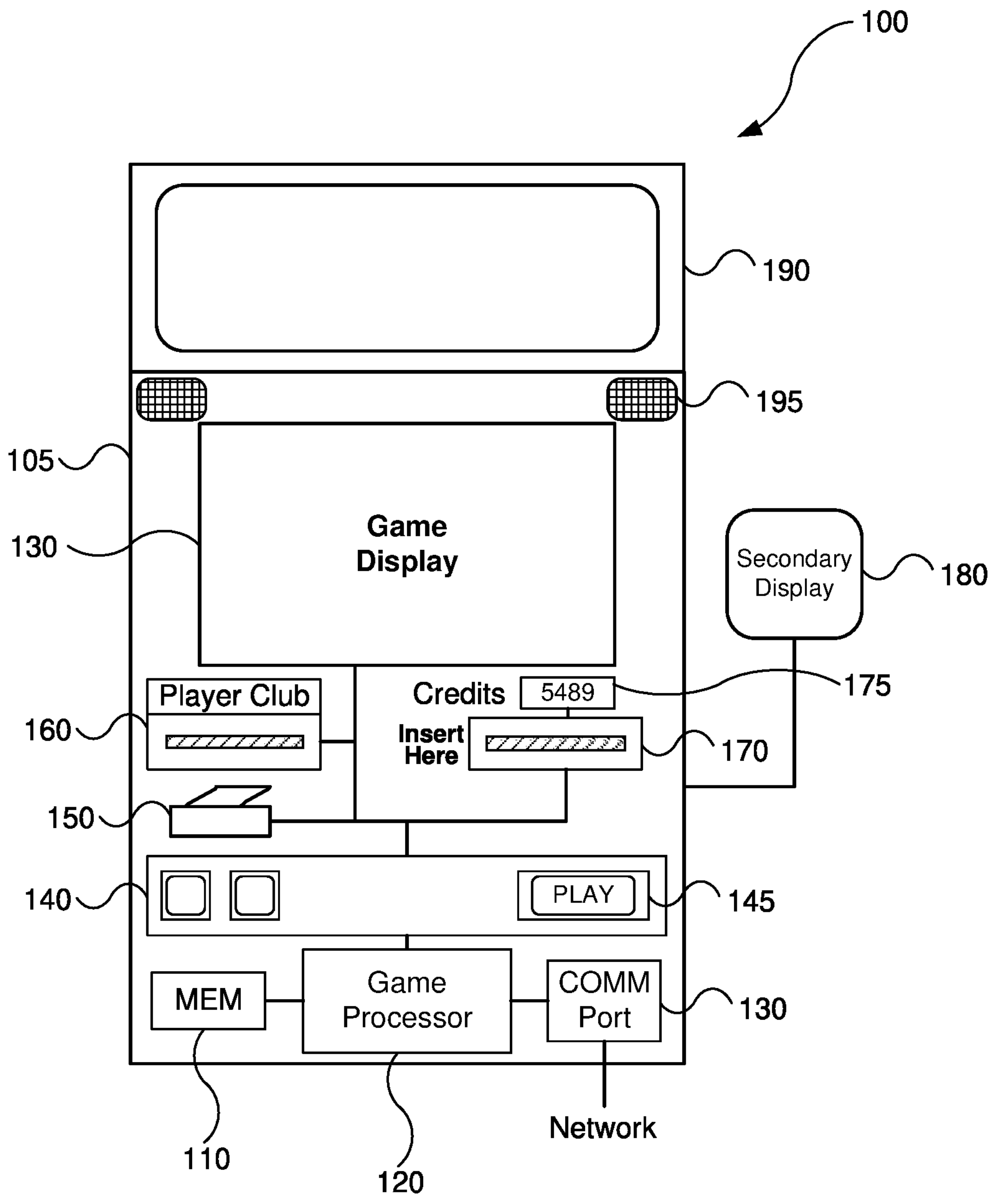
FIG. 2 is a functional block diagram that illustrates an example gaming device that can be a part of the gaming system shown in FIG. 1.

FIG. 2 is a functional block diagram that illustrates an example gaming device that can be a part of the gaming system shown in FIG. 1. Referring to FIG. 2, the illustrated gaming device 100 is an example of the EGMs 10, 12 that are shown in FIG. 1. These EGMs 10, 12 may include all types of electronic gaming machines, such as physical reel slot machines, video slot machines, video poker gaming devices, video blackjack machines, keno games, and any other type of devices may be used to wager monetary-based credits on a game of chance. As mentioned above, various other types of gaming devices may be connected to the network 50 (FIG. 1) such as wireless gaming devices 36, computers used for gaming purposes 72, cellular phones 34, multi-player gaming stations, server-based gaming terminals, etc.

Returning to FIG. 2, the illustrated gaming device 100 includes a cabinet 105 to house various parts of the gaming device 100, thereby allowing certain components to remain securely isolated from player interference, while providing access to player input/output devices so that the player may interact with the gaming device. The securely housed components include the game processor 120, memory 110, and connection port 130. The game processor 120, depending on the type of gaming device 100, may completely or partially control the operation of the gaming device. For example, if the gaming device 100 is a standalone gaming device, game processor 120 may control virtually all of the operations of the gaming device and attached equipment. In other configurations, the game processor 120 may implement instructions generated by or communicated from a remote server (e.g., server 60 shown in FIG. 1) or other controller. For example, the game processor 120 may be responsible for running a base game of the gaming device 100 and executing instructions received over the network 50 from a bonus server or player tracking server. In a server-based gaming environment, the game processor 120 may simply act as a terminal to perform instructions from a remote server that is running game play on the gaming device 100.

The memory 110 is connected to the game processor 120 and may be configured to store various game information about gameplay or player interactions with the gaming device 100. This memory may be volatile (e.g., RAM), non-volatile (e.g., flash memory), or include both types of memory. The connection port 130 is also connected to the game processor 120. This connection port 130 typically connects the gaming device 100 to a gaming network, such as the gaming network 50 described above. The connection port 130 may be structured as a serial port, parallel port, Ethernet port, optical connection, wireless antenna, or any other type of communication port used to transmit and receive data. Although only one connection port 130 is shown in FIG. 1, the gaming device 100 may include multiple connection ports. As described above, in many existing gaming devices, this connection port 130 is a serial connection port utilizing a SAS protocol to communicate to one or more remote game servers, such as player tracking servers, bonus servers, accounting servers, etc.

The player input/output devices housed by the gaming cabinet 105 include a game display 130, a button panel 140 having one or more buttons 145, a ticket printer 150, a bill/ticket reader 170, a credit meter 175, a player club interface device 160, and one or more game speakers 195. Various gaming devices may include fewer or more input/output devices (e.g., a game handle, a coin acceptor, a coin hopper, etc.) depending upon the configuration of the gaming device.

The gaming display 130 may have mechanical spinning reels, a video display, or include a combination of both spinning reels and a video display, or use other methods to display aspects of the gameplay to the player. If the gaming display 130 is a video display, the gaming display may include a touch screen to further allow the player to interact with game indicia, soft buttons, or other displayed objects. The button panel 140 allows the player to select and place wagers on the game of chance, as well as allowing the player to control other aspects of gaming. For example, some gaming devices allow the player to press a button 145 to signal that he or she requires player assistance. Other buttons may bring up a help menu and/or game information. The buttons 145 may also be used to play bonuses or make selections during bonus rounds.

Ticket printers 150 have relatively recently been included on most gaming devices to eliminate the need to restock coin hoppers and allow a player to quickly cash-out credits and transfer those credits to another gaming device. The tickets can also typically be redeemed for cash at a cashier cage or kiosk. The ticket printers are usually connected to the game processor and to a remote server, such as a TITO server to accomplish its intended purpose. In gaming devices that have more than one peripheral device, and which include only a single SAS port, the peripheral devices all share communication time over the connection port 130.

Another peripheral device that often requires communication with a remote server is the player club interface device 160. The player club interface device 160 may include a reader device and one or more input mechanisms. The reader is configured to read an object or indicia identifying the player. The identifying object may be a player club card issued by the casino to a player that includes player information encoded on the card. Once the player is identified by a gaming device, the player club interface device 160 communicates with a remote player server through the connection port 130 to associate a player account with the gaming device 100. This allows various information regarding the player to be communicated between the gaming device 100 and the player server, such as amounts wagered, credits won, and rate of play. In other embodiments, the card reader may read other identifying cards (such as driver licenses, credit cards, etc.) to identify a player. Although FIG. 2 shows the reader as a card reader, other embodiments may include a reader having a biometric scanner, PIN code acceptor, or other methods of identifying a player so as to pair the player with their player tracking account. As is known in the art, it is typically advantageous for a casino to encourage a player to join a player club since this may inspire loyalty to the casino, as well as give the casino information about the player's likes, dislikes, and gaming habits. To compensate the player for joining a player club, the casino often awards player points or other prizes to identified players during game play.

Other input/output devices of the gaming device 100 include a credit meter 175, a bill/ticket acceptor 170, and speakers 195. The credit meter 175 generally indicates the total number of credits remaining on the gaming device 100 that are eligible to be wagered. The credit meter 175 may reflect a monetary unit, such as dollars, or an amount of credits, which are related to a monetary unit, but may be easier to display. For example, one credit may equal one cent so that portion of a dollar won can be displayed as a whole number instead of decimal. The bill/ticket acceptor 170 typically recognizes and validates paper bills and/or printed tickets and causes the game processor 120 to display a corresponding amount on the credit meter 175. The speakers 195 play auditory signals in response to game play or may play enticing sounds while in an "attract-mode," when a player is not at the gaming device. The auditory signals may also convey information about the game, such as by playing a particularly festive sound when a large award is won.

The gaming device 100 may include various other devices to interact with players, such as light configurations, top box displays 190, and secondary displays 180. The top box display 190 may include illuminated artwork to announce a game style, a video display (such as an LCD), a mechanical and/or electrical bonus display (such as a wheel), or other known top box devices. The secondary display 180 may be a vacuum fluorescent display (VFD), a liquid crystal display (LCD), a cathode ray tube (CRT), a plasma screen, or the like. The secondary display 180 may show any combination of primary game information and ancillary information to the player. For example, the secondary display 180 may show player tracking information, secondary bonus information, advertisements, or player selectable game options. The secondary display may be attached to the game cabinet 105 or may be located near the gaming device 100. The secondary display 180 may also be a display that is associated with multiple gaming devices 100, such as a bank-wide bonus meter, or a common display for linked gaming devices.

In operation, typical play on a gaming device 100 commences with a player placing a wager on a game to generate a game outcome. In some games, a player need not interact with the game after placing the wager and initiating the game, while in other games, the player may be prompted to interact with the gaming device 100 during game play. Interaction between the player and the gaming device 100 is more common during bonuses, but may occur as part of the game, such as with video poker. Play may continue on the gaming device 100 until a player decides to cash out or until insufficient credits remain on the credit meter 175 to place a minimum wager for the gaming device.

Communication between gaming devices, such as those described above, and other devices on gaming systems 2 (FIG. 1) is becoming increasingly more complex. The below-described system illustrates a system and method of communication on modern and future gaming systems.

Figure 3A:
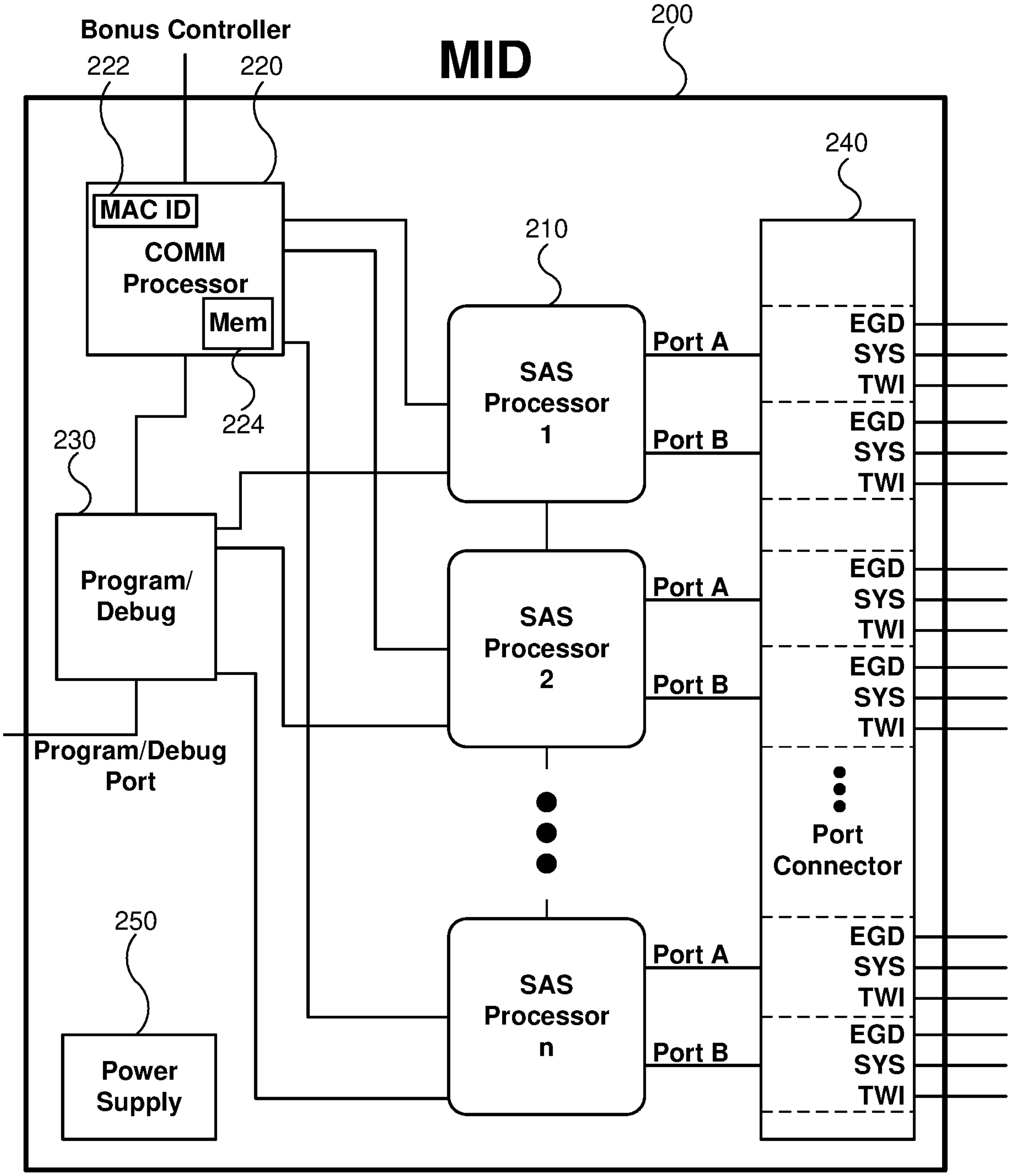
FIG. 3A is a block diagram of an example machine interface device shown in FIG. 1 according to embodiments of the invention.

FIG. 3A is a block diagram of a MID 200, which may be an example of the MID 20 described with reference to FIG. 1 above. The MID 200 includes a set of processors 210, which in this example are termed SAS processors. These SAS processors are capable of accepting, manipulating, and outputting data on a SAS protocol network.

The MID 200 is capable of communicating using other communication protocols as well, as described below. Each processor 210 is structured to couple to two Electronic Gaming Devices (EGDs). EGDs may include, for example, gaming devices such as EGM 10 of FIG. 1, or other electronic gaming devices. In the illustrated embodiment, each SAS processor 210 includes two ports, A and B, each of which may be coupled to an EGD. In turn, the two ports A and B are attached to a set of physical connectors, illustrated here as a single connector 240 for convenience of explanation. Each section of the physical connector 240, delineated by dotted lines, includes three separate pairs of communication lines. Each pair of communication lines is illustrated as a single line—a first serial pair labeled EGD, a second serial pair labeled SYS, and a third communication pair that uses two-wire communication, labeled TWI. Note that each of the ports A and B of the SAS processor 210 includes all three communication pairs. Additionally each of the sections of the physical connector 240 includes wires for a voltage and ground reference, though not depicted in FIG. 3A. In an embodiment of the MID 200 with four SAS processors 210, the physical connector 240 includes up to eight sections, each of which may be embodied by a separate, standard, RJ-45 connector to couple to a matching RJ-45 port in the connected EGM 10, or EGD, as determined by the specific implementation.

As illustrated in FIG. 3A, the first serial pair of Port A couples to EGD. The second serial pair may be coupled to external devices connected to the EGD, as needed. Specifically, some serial data protocols, such as SAS, do not allow EGMs 10 to interface with multiple external devices over a single serial communication path. Such external devices may include, for example, player tracking systems and accounting systems. If a particular EGM 10 is already connected to such a system, and thus its SAS port is "full," the MID 200, and in particular a SAS processor 210, may insert itself "between" the connected system and the EGM 10 by using both of the serial pairs in a particular port of the SAS processor 210 to couple to the EGM 10 and the other connected system, respectively. In operation, the MID 200, through the respective SAS processor 210, passes any information directed from the external device coupled to the SYS communication lines in a particular port to the EGD of the same port, or vice-versa, in real time and without interruption. For example, polls, requests for information, and transmission of information are passed from a connected player tracking system, through the SYS lines of Port A to the serial line EGD of Port A. Only a small communication delay is added using such a communication system, which is well within the tolerance limits of SAS protocol. As a result, both the EGM 10 and external system behave as if the MID 200 were not present.

Further, the third communication pair, a two-wire interface labeled TWI, presents opportunity for expansion to future systems installed on the EGM 10, or a new EGM, so that any data may be communicated between the EGM 10 and the MID 200. The TWI may be connected to card readers, top boxes, ticket dispensers, lighting panels, etc. that are coupled to or work in conjunction with an EGM 10.

Besides simply passing information between communication interfaces, the MID 200 also generates information directly for connected EGDs, which may originate from the MID 200 or from another device as described below. In such a case the SAS processor 210 sends the appropriate data through its appropriate serial line or two-wire interface directly to the desired EGD. Then the EGD may send its own data to its connected peripheral.

Referring back to FIG. 3A, the MID 200 additionally includes a communication processor 220, labeled as COMM processor. The communication processor 220 is coupled to each of the SAS processors 210, a program/debug circuit 230, and to a bonus controller 40 (FIG. 1). In practice, the communication processor 220 may be embodied by a small microprocessor, such as the Atmel ATXMEGA256A3, which is readily available to developers, or any other processor or system capable of performing the desired communication functions.

The communication processor 220 collects and aggregates information from the EGDs that are coupled to each of the SAS processors 210 and sends the aggregated information to the bonus controller 40 of FIG. 1. In some embodiments the communication processor 220 is coupled to the bonus controller 40 through an Ethernet interface. The communication processor is structured to parse information from Ethernet data packets and collect it for use by other systems within the MID 200. Because Ethernet is an addressed protocol, by which messages may be sent to a particular Ethernet address, the communication processor 220 also includes an address of the Ethernet device in a MAC ID 222.

The communication processor 220 may also accept information from the bonus controller 40, or other connected devices, and pass such information to the EGDs coupled to the SAS processors 210. The information may include data, instructions, or commands, for instance.

A memory 224, which may be, for instance Ferroelectric Random Access Memory (FRAM) capable of retaining stored contents for over 10 years may be used by the communication processor for both program and data storage. Of course, other memory technologies may be used instead of or in addition to FRAM.

A program/debug circuit 230 in the MID 200 connects to the communication processor 220 as well as to each of the SAS processors 210. During manufacture of the MID 200, the programming functions of the program/debug circuit 230 load program code to each of the SAS processors 210 as well as the communication processor 220. This initial loading may take place through a program/debug communication port. Further, the program codes stored in each of the SAS processors 210 and the communication processor 230 may be updated through commands and data sent from an external device, such as the bonus controller 40, through the communication processor 220 to the program/debug circuit 230. The program/debug circuit 230 then formats the updated program data for each of the connected SAS processors 210 and communication processor 220, and sends a command to each of the processors to be updated to load the new program code.

Figure 3B:
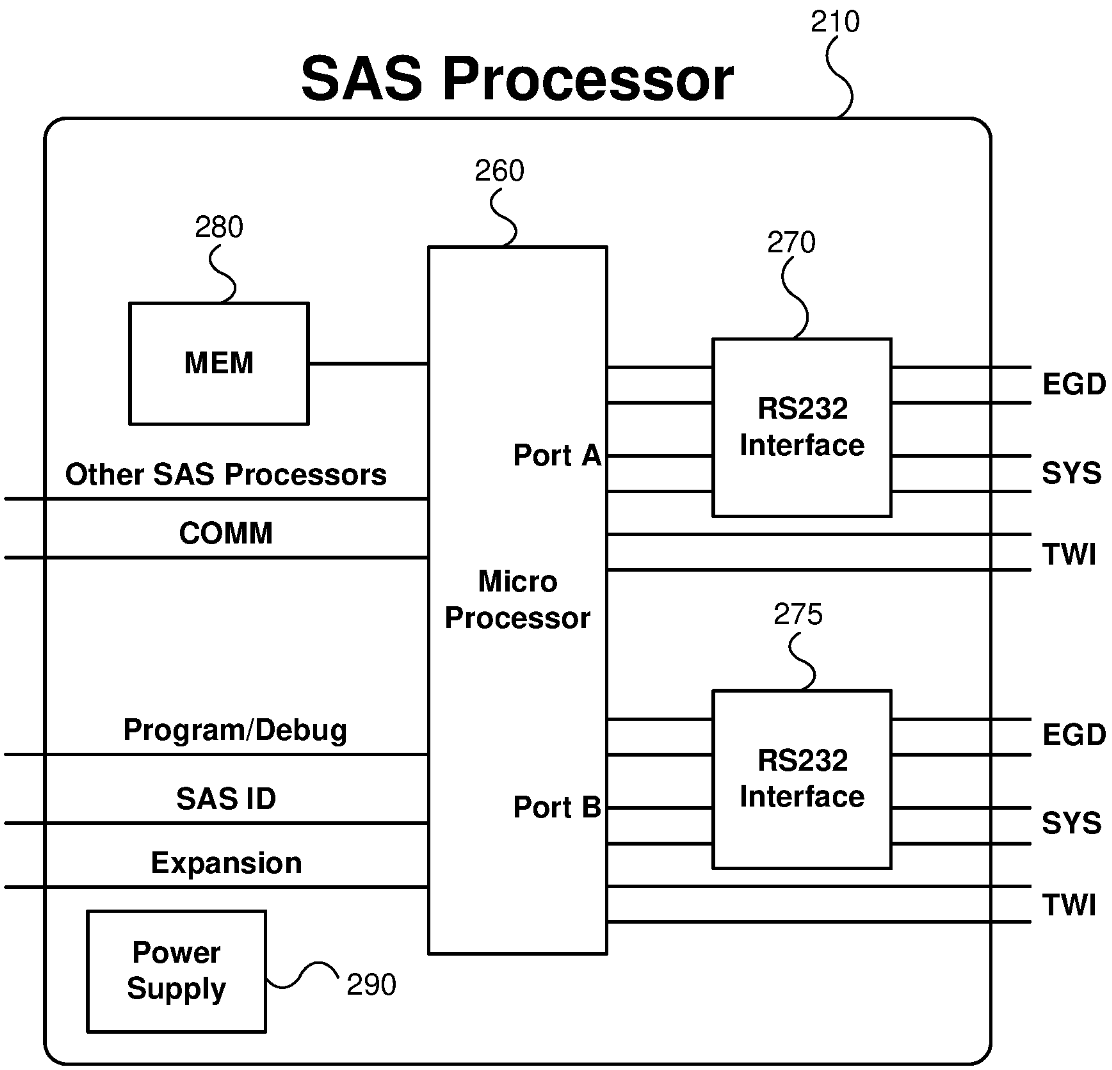
FIG. 3B is a block diagram of an example processor in the machine interface device illustrated in FIG. 3A according to embodiments of the invention.

FIG. 3B is a block diagram of one of the SAS processors 210 of FIG. 3A, which shows additional detail of the SAS processor.

As described above, each of the SAS processors 210 include two separate ports, Port A and Port B, illustrated here as separate ports of a microprocessor 260. The microprocessor 260 in the SAS processor 210 may be embodied by an Atmel ATXMEGA256A3, as described above.

Each of the ports of the microprocessor 260 is structured to couple to an EGD, which may be an EGM 10 of FIG. 1. Each port of the microprocessor 260 includes two serial connections, which in the example embodiment illustrated in FIG. 3B, are RS-232 ports common in the computing industry. The RS-232 ports are contained in an RS-232 interface 270, 275, one for each port of the microprocessor 260. Each of the interfaces 270, 275 includes two separate RS-232 ports, each of which uses a separate transmit and receive wire. Thus, each interface 270, 275 includes a total of four wires. It is convenient to include RS-232 ports as the preferred mode of communication because it is the standard interface for SAS ports of the EGMs 10. In non-standard EGMs 10, such as very old or future devices that may not include SAS ports, communication ports other than RS-232 may be used simply by exchanging or updating the RS-232 interfaces 270, 275. Another possibility is to include an RS-232 translator in any EGM 10 that does not include its own RS-232 interface. As illustrated in FIG. 3B, and as described above, the first of the serial connections, labeled EGD, is connected to an EGD for the particular port of the microprocessor 260, while the second serial connection, labeled SYS is connected to external devices that may be coupled to the particular EGD.

Additionally, and as described above, each SAS processor 210 includes two, two-wire interfaces, illustrated as a separate interface pair and labeled as TWI. In this embodiment, there is one pair for each port of the microprocessor 260. Each two-wire interface creates a bi-directional serial port that may be used for communicating with peripheral or expansion devices associated with the EGD of the particular microprocessor 260, or with other devices on the gaming system 2 of FIG. 1.

The SAS processor 210 includes a memory 280 for storing instruction data of the microprocessor 260 as well as providing data storage used by the SAS processor. The memory 280 is preferably non-volatile memory, such as FRAM that is connected to the microprocessor 260 through a serial interface.

As described above, the SAS processor 210 of the MIB 200 (FIG. 3A) includes multiple connections to other components in the MIB 200, which are illustrated in detail in FIG. 3B. Initially, each SAS processor 210 is coupled to each of the other SAS processors 210 in the MIB 200. In practice, this may be accomplished by a direct connection, in which each microprocessor 260 is directly coupled to one another, or such connection may be an indirect connection. In an indirect connection, the microprocessors 260 of each SAS processor 210 is coupled to the communication processor 220 (FIG. 3A). Any data or information to be shared between SAS processors 210 is then originated by or passed through the communication processor 220 to the other SAS processors.

Similarly, as described above, the microprocessor 260 of each SAS processor 210 is coupled to a program/debug circuit 230 for initial or later programming. To communicate with each SAS processor 210 individually, each SAS processor is given an individual identification number, which may be set for the microprocessor 260 by tying particular data pins of the microprocessor to permanent low or high signals. Using binary encoding, n individual lines are used to identify 2*n* separate processors. A set of expansion pins couples to the microprocessor 260 of each SAS processor 210 so that each processor may determine system identification and revisions of the MIB 200 and the connected bonus controller 40.

Figure 4:
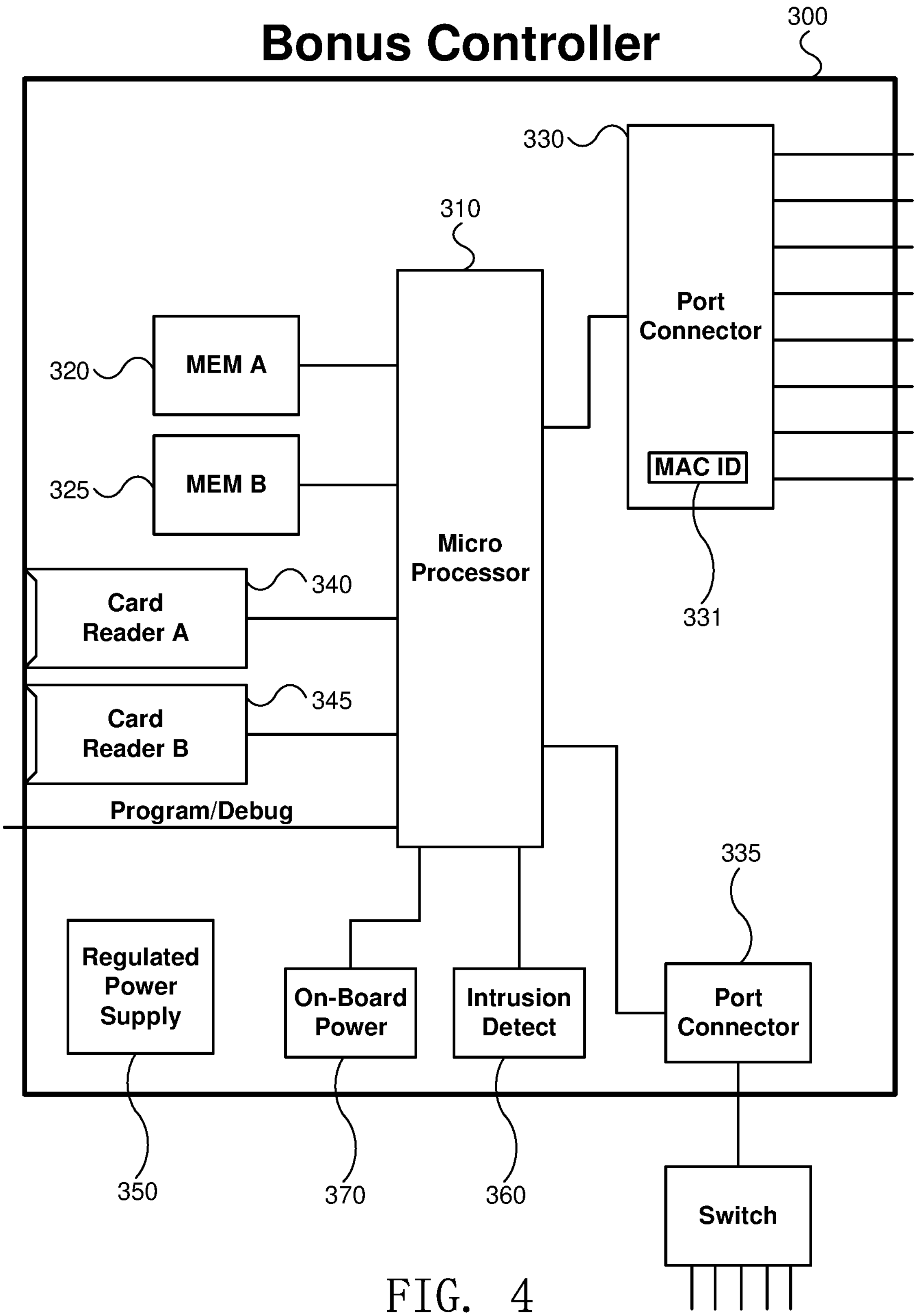
FIG. 4 is a block diagram of an example bonus controller shown in FIG. 1 according to embodiments of the invention.

With reference back to FIG. 1, recall that the bonus controller 40 couples to each of the MIDs 200, and by extension to their coupled EGDs, such as EGMs 10, and possibly to one or more EGMs themselves, to cause data and commands to be sent to the EGMs to control functions on each EGM. FIG. 4 is a detailed block diagram of such a bonus controller, according to embodiments of the invention.

A bonus controller 300 of FIG. 4 may be an embodiment of the bonus controller 40 illustrated in FIG. 1. Central to the bonus controller 300 is a microprocessor 310, which may be an Atmel AT91SAM9G20, which is readily available to developers. The microprocessor 310 is coupled to one or more memory systems 320, 325. A memory system 320 is a 2 Megabyte FRAM while memory system 325 is a 64 Megabyte Synchronous DRAM (SDRAM). Each memory system 320, 325 has various advantages and properties and is chosen for those properties. FRAM maintains its data autonomously for up to ten years, while SDRAM is relatively fast to move data into and out of, as well as being relatively inexpensive. Of course, the sizes and types of memory included in any bonus controller according to embodiments of the invention may be determined by the particular implementation.

The microprocessor 310 also couples to a pair of card readers, 340, 345, which are structured to accept easily replaceable, portable memory cards, as are widely known. Each card reader may further include Electro-Static Discharge (ESD) devices to prevent damage to internal circuitry, such as the microprocessor 310, when cards are inserted or removed from the card readers 340, 345. In practice, a card in one of the card readers 340, 345 may store program code for the microprocessor 310 while a card in the other reader may store data for use by the bonus controller 300. Alternatively a single card in either of the card readers 340, 345 may store both program and data information.

A port connector 330 includes multiple communication ports for communicating with other devices. With reference back to FIG. 3A, the communication processor of each MID 200 couples to a connected bonus controller through such a communication port. The communication port 330 is preferably an Ethernet interface, as described above, and therefore additionally includes a MAC address 331. The port connector 330 includes multiple separate connectors, such as eight, each of which connect to a single MID 20 (FIG. 1), which in turn connects to up to eight separate EGMs 10. Thus, a single bonus controller 300 may couple to sixty-four separate EGMs by connecting through appropriately connected MIDs.

Further, a second port connector 335 may be included in the bonus controller 300. The second port connector may also be an Ethernet connector. The purpose of the second port connector 335 is to allow additionally connectivity to the bonus controller 300. In most embodiments the second port connector 335 may couple to another bonus controller 300 or to other server devices, such as the server 60 on the gaming network 50 of FIG. 1. In practice, the second port connector 335 may additionally be coupled to a MID 20, thus providing the bonus controller 300 with the ability to directly connect to nine MIDs 20.

Yet further, Ethernet connections are easily replicated with a switch, external to the bonus controller 300 itself, which may be used to greatly expand the number of devices to which the bonus controller 300 may connect.

Because the bonus controller 300 is intended to be present on a gaming network 50, and may be exposed to the general public, systems to protect the integrity of the bonus controller 300 are included. An intrusion detection circuit 360 signals the processor 310 if a cabinet or housing that contains the bonus controller 300 is breached, even if no power is supplied to the bonus controller 300. The intrusion detection circuit may include a magnetic switch that closes (or opens) when a breach occurs. The microprocessor 310 then generates a signal that may be detected on the gaming network 50 indicating that such a breach occurred, so that an appropriate response may be made. An on-board power circuit 370 may provide power to the bonus controller 300 for a relatively long time, such as a day or more, so that any data generated by the processor 310 is preserved and so that the processor 310 may continue to function, even when no external power is applied. The on-board power circuit 370 may include an energy-storing material such as a battery or a large and/or efficient capacitor.

Similar to the microprocessor processor 260 of the SAS processor 210 described above, the microprocessor 310 of the bonus controller 300 is additionally coupled to a program/debug port for initially programming the microprocessor 310 during production, and so that program and/or other data for the microprocessor may be updated through the program/debug port.

In operation the bonus controller 300 configures and controls bonus features on gaming devices through a gaming network 50 or through other communication systems. Bonus features are implemented through each gaming device's internal structure and capabilities, and may include integration with additional peripheral devices. Bonusing programs for the connected games may be introduced to the bonus controller 300 by updating data stored in the memory systems directly on the bonus controller, or by inserting new memory cards in one or more of the card readers 340, 345. Such a platform provides a facility for game developers, even third-party developers, to define and program new types of bonus games that may be used in conjunction with existing EGMs on existing gaming networks, or on new games and new networks as they are developed.

The term casino, as used within this description, signifies any entity that operates gambling games, including on-line casinos, bricks and mortar, casinos, racinos, lottery locations, etc. A gambling game is one where something of value is wagered on a chance to win an award of greater value.

The term gambler, as used in this description, indicates any person who may legally gamble. This includes persons that already gamble and persons who do not currently gamble but may be enticed to do so.

The use of Personal Electronic Devices (PEDs) is rapidly gaining popularity. Such devices include computers, mobile phones, smart phones, personal data assistants or other such instruments. Many, though not all, of these devices are small enough to be easily carried without undue effort.

A PED, whether personally owned by the gambler, or simply loaned to the gambler by the casino, may be used as an efficient and effective communications channel for bonuses, information, and services. This communications channel is useful for gamblers within, and outside, the casino. Gamblers already on a casino property can use the PEDs to find the most appropriate games to play, while also gaining personalized access to information about bonuses and services the casino offers.

Example PEDs include such devices as the iTOUCH, iPHONE and iPAD of Apple, Inc., the BLACKBERRY of Research in Motion, the 'DROID of Motorola, netbooks, personal computers, personal music players, such as the iTOUCH and iPOD of Apple Inc., and other device equipped with at least one communications medium. The PED may include custom program software contained within it to implement aspects of the invention. This custom program may be executed alone on the PED, or in a multi-tasking environment wherein it shares the PED resources with other applications.

Many embodiments of this invention may be implemented as web pages. In such a case, no custom program software is required on the PED as virtually all modern PEDs include or are able to acquire one or more web browsers. A PED user could simply enter the appropriate web or locating address and view information as a web page or a series of web pages.

When security is needed, the web pages could be implemented as secure web pages. Whether a custom software or a web browser is used, each user could be assigned a user ID and password or PIN to enhance security and to direct the PED to information specific to that user.

Figure 5:
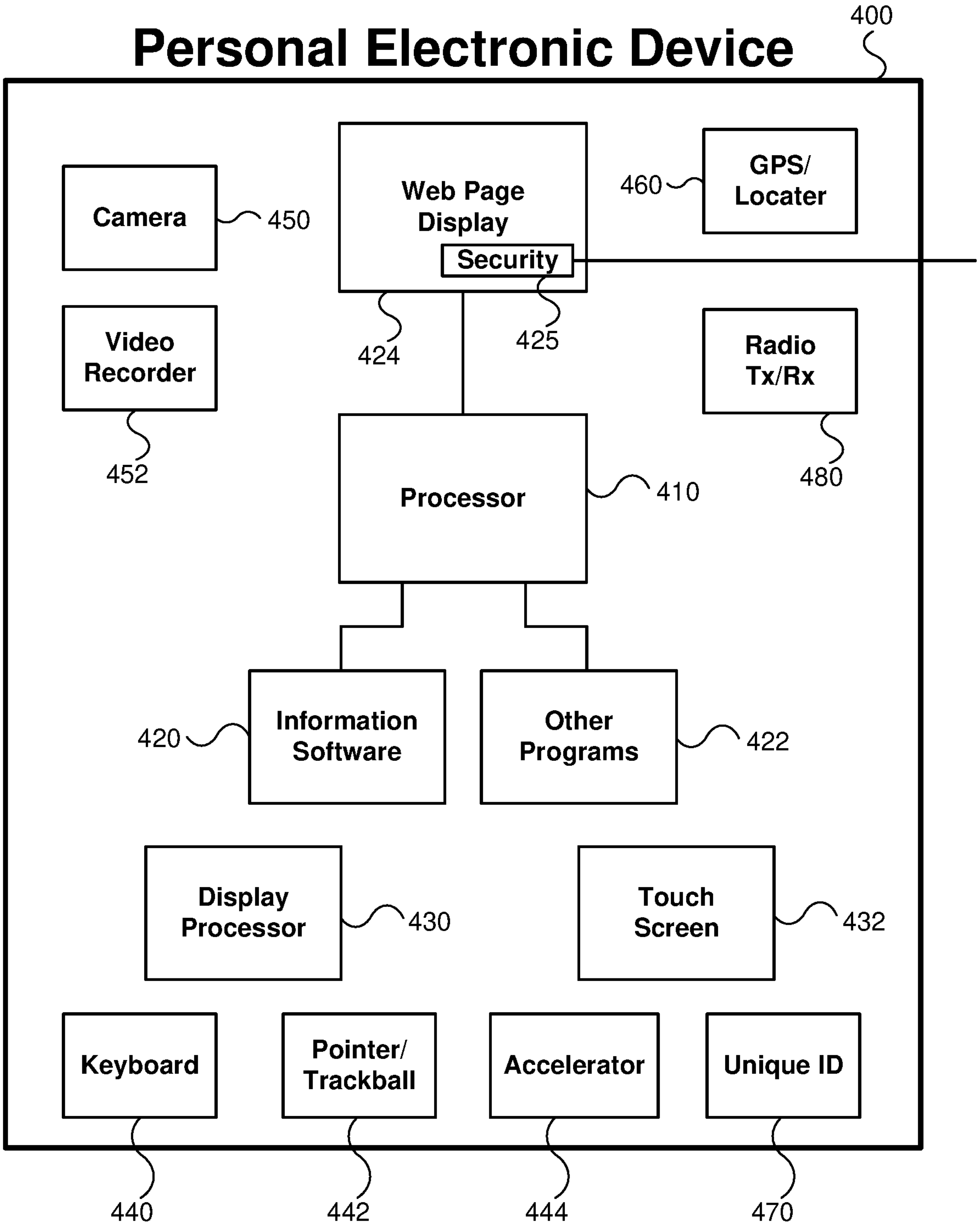
FIG. 5 is a block diagram of an example personal electronic device according to embodiments of the invention.

FIG. 5 is a functional block diagram of an example PED according to embodiments of the invention. The PED 400 of FIG. 5 includes a variety of illustrated functions, although all of the functions are not necessary to be present in every PED device that operates according to embodiments of the invention.

The PED 400 includes a processor 410 that couples to many of the other functional components of the PED, either directly or indirectly. In FIG. 5 some of the connection lines between components are omitted for clarity, but each component portion may communicate with any other portion, either directly or through a communication path, which may include the processor 410.

The processor 410 generally runs information software 420 to process information according to embodiments of the invention and communicate it to the user. The information software 420 may operate alone or in conjunction with other programs 422 operating on the PED 400 as well. One such program may include a web browser 424, which may include its own security module 425 within. In operation, a user may have to authenticate himself or herself, as described below, to access information on the web page or secure web page.

The PED 400 includes several input/output devices, such as a display processor 430, which may be connected to a touch screen or other type of display screen 432. Input can be received from the user from a keyboard 440, pointer or trackball 442, or accelerator 444 such as by tipping, shaking, or moving the PED 400. Additionally the PED 400 may include imaging devices, such as a still camera 450 or video camera 452.

The PED 400 may be able to determine its own location using a GPS locator 460, which may also or instead use cell phone tower or other locating mechanisms. The GPS locator 460 may periodically broadcast the location of the PED 400, or may always act in a receiving mode only.

To identify each PED 400, as well as a user of such a PED, the PED includes an ID facility 470, which are typically permanent and non-modifiable, as is known in the art.

Each PED 400 includes a radio 480, which is used to transmit and receive information from other portions of the gaming system 2 of FIG. 1, as described herein.

In operation, the PED, such as the PED 400, could be used to simply display visual and/or audio information or the implementation could be interactive with the user selecting options or providing information through the device's touch screen 432, track ball 442 or keyboard 440. Other forms of user input include gestures, such as tipping the PED 400 in one direction, as sensed by the accelerator 444. The PED 400 may be sensitive to voice or other commands. In some applications, the PEDs built-in camera 450 or video recorder 452 can be used. In some applications, the PEDs built-in location sensing technology 460 could be used to determine where the user is and what options and offers to make available to them based upon that location information.

Gamblers located outside the casino receive personalized contextual information concerning game statuses, bonuses and services that they'll enjoy and that will make them more likely to again visit the casino property.

Figure 6A:
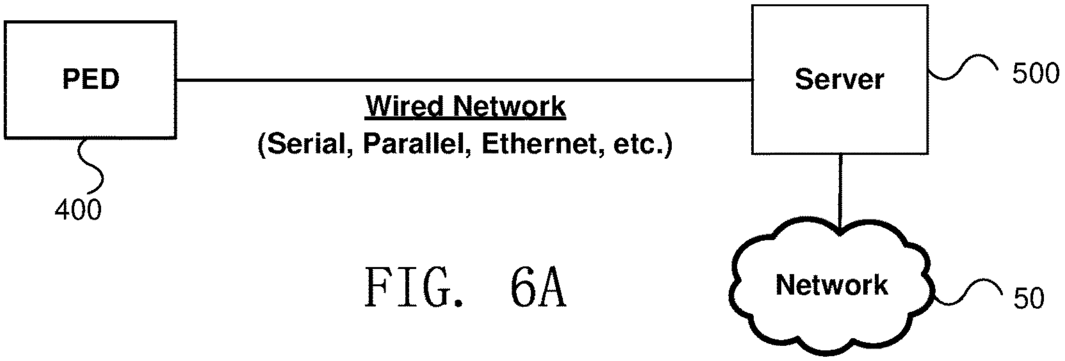
FIGS. 6A-6D are system diagrams illustrating various operating environments of the personal electronic devices of FIG. 5, according to embodiments of the invention.
Figure 6B:
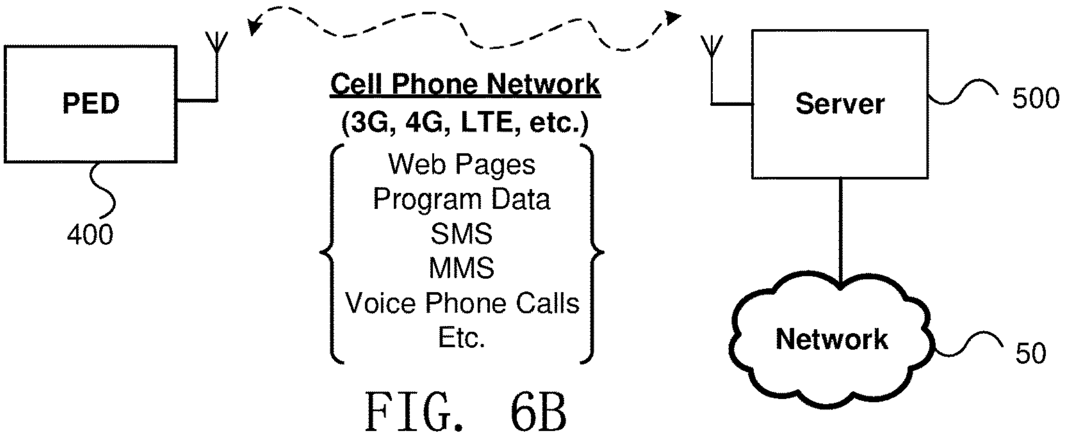
Figure 6C:
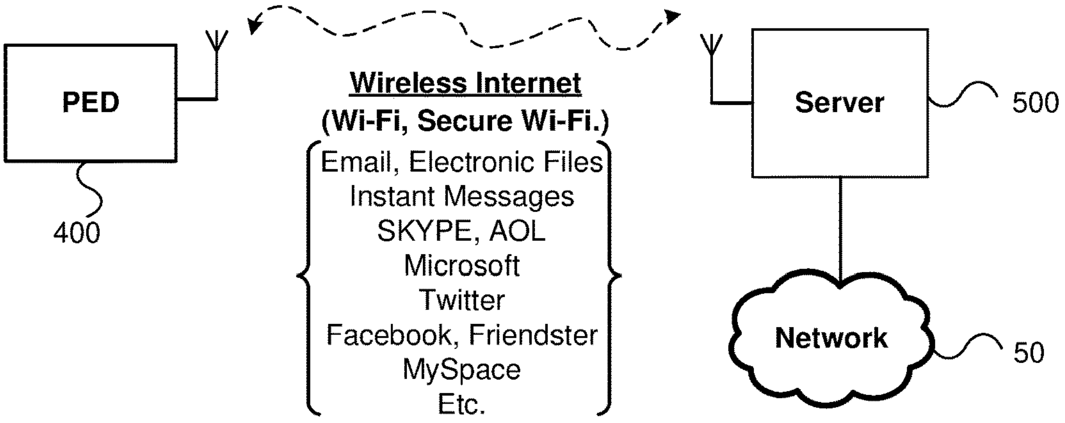
Figure 6D:
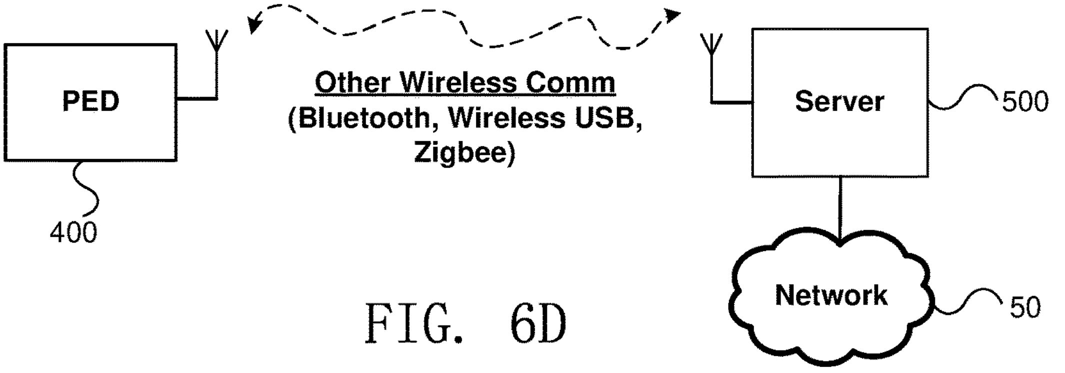

The PEDs 400 used in embodiments of the invention communicate with components of the gaming system 2 (FIG. 1) using a variety of different types of wired and/or wireless communications. For instance, with reference to FIG. 6A, in a simple embodiment the PED 400 is directly wired to a server 500, which is coupled to the gaming network 50 of FIG. 1. Examples of such wired networks can include serial communication and/or parallel communication using a variety of protocols, such as Ethernet or other protocols appropriate for the application. With reference to FIG. 6B, the communication medium between the server 500 and PED 400 could be a cell phone voice or data communication system, such as 3G, 4G, or LTE, for example. Using such a communication medium, information sets can be sent between the gaming system 2, through the server 500, and PED 400 in the form of Web pages, SMS, MMS, Voice phone calls, and/or program data, for example. Other forms of communication, as illustrated in FIG. 6C may include wireless internet, such as Wi-Fi, Secure Wi-Fi, Wi-Max, and other wireless methods of communication. Because the internet is pervasive, and continuously growing, future protocols will likely be developed for communicating over existing IP networks such as illustrated in FIG. 6C. Such wireless IP networks may carry information sets between the Server 500 and PED 400 in the form of Email, file transfer, Instant Message, SKYPE, AOL, Microsoft, Twitter, Facebook, Friendster, MySpace, as well as other social networks, for example. Further, as illustrated in FIG. 6D, other wireless communication methods may be employed to communicate between the server 500 and PED 400 using protocols such as Bluetooth, Wireless USB, and Zigbee, for example. Other forms of communication may include near-field magnetic or infra-red systems, for example.

Each communication medium has strengths and weaknesses within each application as will be described below. Further, any communications medium may be used in conjunction with other communications mediums as well as with the Internet or other such network, in order to accomplish the transfer of information.

Of course PED devices 400, and the communications mediums they support, will evolve as technology advances and all such PEDs and communications mediums may be useful with this invention.

In general, information is communicated between the gaming system 2 of FIG. 1 and the PED 400 according to embodiments of the invention using information sets.

Information sets may be composed of any information of interest, or potential interest to a gambler. This information may relate to a bonus, a gambling game, a bonus game, a casino, a group of casinos, a loyalty club, play inducement, or an amenity such as a restaurant, a show, a hotel room, a gift shop, etc.

An information set may include information already available at specific locations. In this case, presenting that information in a consolidated form to the gambler via the PED 400 provides convenience to the gambler. An information set may also include information of not generally available by other means or not available at all by other means. In these cases, presenting the information via the PED 400 gives the gambler a perceived advantage over other gamblers.

Examples of information sets include, but are not limited to: Information about gambling games, including the quantity, location and configuration of specific games, as well as information about historical and current performance on the game. An example information set may state:

7 Blackjack tables located in the south casino floor area. 18 currently open. 2 tables have bet limits of $5 to $200, 4 tables have bet limits of 20 to $1,000 and 1 table have bet limits of $100 to $5,000.

Additional information, such as a map of the casino showing the location of the table games, a list or map of how many gamblers are actively playing at each table, bet size of each gambler, whether each player is winning or losing, dealer identity, whether the dealer is winning or losing, type of shuffler used at the table, table configuration such as number of decks dealt, house rules for the area or specific table, etc. may also be made available.

An information specific to gaming machines may state:

27 "Reel 'em In" slot machines total. 15 are located in area 5 and 12 are located in area 7. 9 are configured as penny games, 11 as nickel games and 7 as dollar games.

Additional information, such as a map of the casino showing the specific location of each game, a list or map showing which games are currently played, which players are winning and losing, the historical wins and losses for each game, a list, including jackpot size and time/date won of all jackpots over $500 hit at each game, when the machine was last entered by a service technician, theoretical par percentage, game performance in comparison to theoretical par, etc. may also be presented.

Information sets about bonuses may also be presented. For example, a list of all progressive jackpots, including current jackpot values, jackpot starting values, jackpot limits, increment rates, history of all progressive jackpots won, including time, date, amount winning gambler identification and/or photo, personal information about the winning gambler, duration of time the gambler played before striking the progressive jackpot, amount of money the winning gambler spent before winning the progressive jackpot, etc.

If the progressive jackpot is a mystery award, the odds of winning and/or the win proximity or likelihood of winning may be included in the information set as described in U.S. patent application Ser. No. 12/389,309, filed Feb. 19, 2009, entitled METHOD AND APPARATUS FOR SELECTIVELY INDICATING WIN PROBABILITY, and Ser. No. 12/037,206, entitled METHOD AND APPARATUS FOR INDICATING WIN PROXIMITY, filed Feb. 27, 2008, which are herein incorporated by reference.

Other bonuses, including bonus games may be presented as information sets. When the information set is a bonus game, the gambler could interact with the bonus using the keyboard 440, touch screen 432, gesture recording using the accelerator 444, voice input, telephone feature, texting feature, website access or physical movement of the PED 400 to make selections, control the bonus game or otherwise interact.

Other information set examples include status of availability of hotel room for check-in, seating at a show, seating at a restaurant or availability of other entertainment or service. Such information sets may be sent only to specific gamblers or groups of gamblers.

Information sets may be too complex for presentation in a single display or message. Gamblers may use the aforementioned PED 400 interfaces to navigate through a selection system, such as a menu, to find the information of interest.

Alternately, personal information about the gambler, whether derived from the gambler himself or herself, from observation of prior play patterns of the gambler or from demographic or psychographic about the gambler, including information derived from information about other gamblers with similar characteristics, is used to present the gambler with specific information sets or subsets of information sets.

In one embodiment, not all information is available to all gamblers. Some information sets may be available only to loyalty club members, those members who have acquired over a minimum amount of points, new visitors, members of a junket, paying subscribers or other such qualifications.

Some information sets may be available only while within the casino or other defined space. For example, in some circumstances it may be illegal to gamble, or receive certain gambling information, across interstate lines. In these cases, certain information sets may be made available only to gamblers within a state boundary.

Other forms of bonuses may include, player club promotions, drawings and special offers such as match play or free play.

Figure 7:
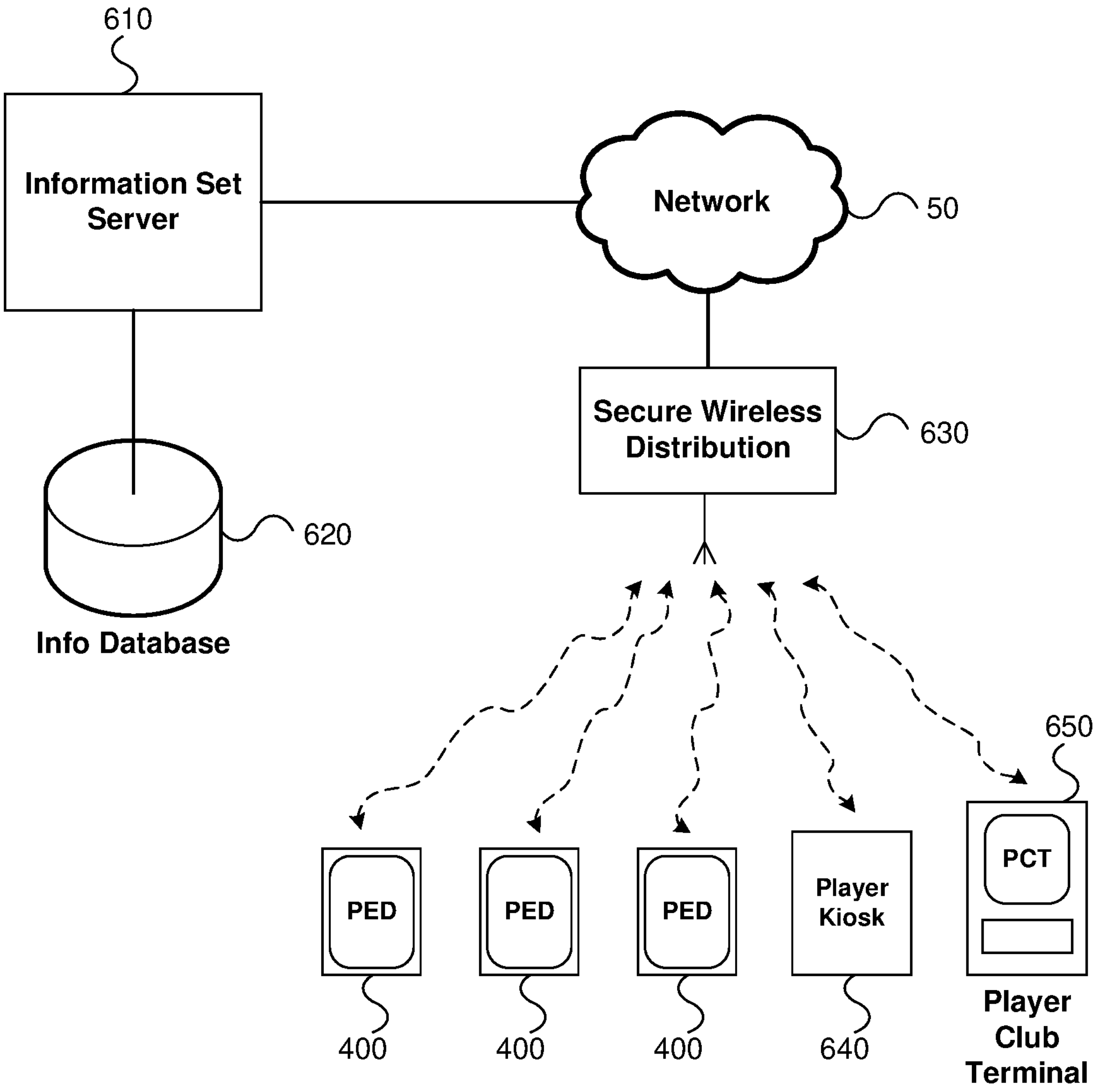
FIG. 7 is a system diagram illustrating components of a gaming system that can be integrated with or additional to those of FIG. 1.

FIG. 7 is a system diagram illustrating components of a gaming system that can be integrated with or additional to those of FIG. 1. In FIG. 7, an information set (IS) server 610 is coupled to an information set database 620. The information set server 610 also couples to the gaming network 50 of FIG. 1, and thus can communicate with each device throughout the gaming system 2, including the MID 20 and bonus controller 40. In some embodiments each MID 20 may connect to a gaming device 10 or gambling machine through a Bluetooth interface. The IS server is also connected to the loyalty club server along with database of gambling machine information (game type, location, configuration, etc.) The IS server 610 is also connected to a secure wireless distribution device 630, which may be an example of the communication server 500 illustrated in FIGS. 6A-6D. In other words, the distribution device 630 may communicate to PEDs 400, as well as to a kiosk 640, which may be an example of the kiosk 14 of FIG. 1 and a player club terminal 650 through communication networks such as those described above, including a Wi-Fi network, public telephone network (perhaps via Internet), and to the public SMS and MMS messaging system. The Internet connection is linked to Facebook and other social services sites, as well as twitter. The Internet connection is also linked to external demographic and psychographic databases for evaluating players. The Internet connection is also linked to external websites such as Expedia.

The IS server 610 is connected to the casino's data warehouse analysis system and to the casino host/customer service interface system, which may be present on the servers 60 and databases 70 of FIG. 1. The IS server 610 is also connected to hotel reservation system, restaurants, showroom systems, bonus servers (such as a progressive jackpot server), gambling game servers, etc. The IS server 610 is also connected to table games through their host management systems.

While in a casino, the gambler's PED 400 device is connected to the IS server 610 through WiFi and an external WAN, such as wireless telephone and wireless data networks. Outside the casino area, the PED 400 may be connected to the Internet and telephone systems through the WAN, wired network or wireless network including Wi-Fi. Transition between various wireless communication systems is seamless to the user of the PED 400.

Data within the information set, and data transferred to identify and qualify the PED 400 to acquire or interact with information sets may be encrypted or unencrypted, in accordance with the value and confidentiality of the data being transferred.

A PED 400 may be concurrently associated with one or more information sets. Specific associations may be temporary or permanent and new associations may be added in addition to, or in place of existing associations.

Each PED 400 is assigned one or more identifiers. These identifiers may be based upon an internal unique identifier 470 built into the PED. For example, many electronic processor or peripheral chips include a permanent identifier stored within the chip. Many PEDs 400 are built with identifier chips installed for the specific purpose of providing an identifier. Unique identifiers may also be provided by inserted memory card, such as a telephone SIM card, an SD memory card or an MMC card in or associated with a PED 400. Unique identifiers may also be derived from identifiers used for network purposes, including MAC address, IP address, or telephone number.

When program code is loaded within a PED 400, a unique identifier may be placed within that code, or the program code may allow the gambler, or the casino, to enter a unique identifier.

When an information set requires security, such as when the information set is a gambling game, or involves the act of wagering or transfer of value, a secure phrase, such as a security code, password, PIN number, etc. may be required as well. In such cases, the secure phrase is held by the gambler using the PED 400 and must be input into the PED in order to fully access an information set.

In another embodiment, a gambler may be given a user ID as a unique identifier. In that case, the gambler may log onto any desired PED 400 by inputting his or her user ID and the optionally required secure phrase. In this embodiment, the user ID is associated with the information set. The gambler may disassociate the user ID from a PED 400 by logging off.

An association between a PED 400 and an information set may last indefinitely, for a fixed period of time, until the gambler or the casino chooses to terminate the association or until an event or a sequence of events occurs.

A PED that has been associated with an information set may be carried by a gambler as a personal device or may be attached, temporarily or permanently, to a gambling game or other location for use by any gambler in close proximity to the PED.

As mentioned above, some information sets may be available to any gambler with access to a PED 400. Other information sets may require payment or subscription in order to access. Still other information sets may require qualification by the gambler prior to access. For example, the gambler may be required to join the player loyalty club, to achieve a certain level in a player loyalty club, to have gambled at a particular level in the past, to meet criteria for estimated capacity to gamble or other such qualifications. These qualifications can be stored in a database on the gaming system 2 and associated with specific PED 400 identifiers and/or player identifiers in such a way that only gamblers with qualifying identifiers are allowed to access the information sets.

The gambler's location may also be used as a qualifier for accessing an information set. For example, information sets containing gambling games may only be accessible from within the physical confines of the casino offering the games.

One embodiment of this invention only allows information sets for such gambling games to be accessible through the WiFi network located within the casino. A gambler outside the casino could not access such information sets.

Another embodiment uses the geo-location services contained within a PED 400 to determine if the gambler is in a qualifying physical location. Such geo-location services may include a GPS or location determination by triangulation from cell towers in communication with the PED, IP address of the PED or other such means whether used separately or in conjunction with other geo-locating services.

In another embodiment, location can be determined by user input. The user may optionally be required to certify the location information, whether obtained from geo-location services or from user input, is correct.

The PED 400 is an excellent platform for implementation of bonuses for gamblers. The below description describes how the PED 400 may be used to implement the above-reference bonus described in the patent application entitled SYSTEM FOR TRADE-IN BONUS.

In the trade-in bonus game, a gambler earns points by discarding certain pairs of dealt cards according to the following schedule and rules:

| Points | Discard |
|---|---|
| 1 | Any two cards of rank Jack, Queen King or Ace |
| 2 | Any pair below rank of Jack |
| 3 | Any Jacks or Better Pair |

Points are awarded on a per credit wagered basis. Trading in a pair of jacks with two credits wagered earns 6 points, for example. The same pair traded with five credits wagered earns 15 points. Importantly, gamblers are free to follow normal game strategy, i.e., not trade in any cards, if they wish, but are ineligible to win bonuses unless required trades are made.

In this embodiment, whenever 15 points are accumulated, the points are automatically traded for an entry card which is randomly selected from a deck of 52 cards. Gamblers who earn sufficient points may hold multiple entry cards.

At 5 minute intervals, a bonus drawing is held and a card is randomly drawn from another deck of 52 cards. Any player with an entry card wins a bonus. In this case, the bonus is doubled payment of any hand with a straight, a flush, a straight flush or a royal flush that occurs within the next 50 games played.

In this example, a PED 400 is associated with a specific gaming machine, which in this instance is an IGT Game King machine. The PED 400 may be mounted directly on the gaming machine and communicate to the gaming machine through the MID 20 as described above. For instance, the MID 20 can connect to the PED 400 through a wired or wireless communication channel. With reference to FIG. 1, the gaming machine may be a gaming device 10, for example. The game is presumed to include the ability to communicate information about game state at two points of game play. The first point for communication is after the wager has been made and the initial cards are dealt to the gambler. At that time the game informs the PED 400 of wager amount and identity of drawn cards. The second point for communication is when the gambler selects the discards and presses "draw." At that time the game replaces discards with new cards. If the resulting hand is a winning hand, the game pays the gambler the amount won. The game then informs the PED 400 of the identity of final cards in hand and amount won.

The Game King machine is equipped with a serial port, which is used to communicate game accounting and state information. Game Kings are typically equipped to utilize the SAS protocol, over the serial port and that protocol includes sufficient information to resolve and report both required game states. Of course, an alternative serial protocol could be used if desired. Also, newer games that support the Gaming Standards Association, or GSA, protocol are available. The GSA protocol uses an Ethernet port to carry game state information. In the case of the GSA protocol, the MID 20 could be omitted and each game directly connected, or connected via Ethernet switch 30 or hub, to the bonus controller 40. The exact means of communicating game states is unimportant to this invention, so long as the desired game states are reported in a timely and reliable manner.

In the embodiment described here, the described portions of the network include a Game King with a serial port running the SAS protocol, as well as a MID 20 and bonus controller 40 passing communication between the IS server 610 and the Game King machine. One of skill in the art of gambling machine systems understands there are many additional components to the gaming network as well as knows that there are alternative ways of achieving such communication that are useful with this invention.

The IS server 610 may be implemented on computer hardware dedicated to the purpose or, for smaller systems, the IS server function could be carried out as a process that resides on the bonus controller 40. In this example, the IS server function is described as carried out on the bonus controller 40, but in other embodiments could be implemented as a stand-alone server, as illustrated in FIG. 7, and connected to PEDs 400 through the wireless distribution device 630. In short, the IS server function could operate on any appropriate device connected to the gaming network 50.

In this example, a separate PED 400, consisting on an Apple iTouch device, set to execute a custom application program, is permanently associated with each gambling machine within the IS server 610 process by using the PED's permanently assigned IP address. This association allows the IS server 610 to forward game state information from the gambling machine to its associated PED 400. The PED 400 is mounted on the gaming machine, such as the gaming device 10 of FIG. 1, inside an enclosure which prevents theft and unauthorized modification. The enclosure also contains a small audio speaker and amplifier connected to the audio output of the iTouch. Audio circuitry is provided to allow reinforcing sounds to accompany each visual screen. For clarity of explanation, audio content is not described in this example.

While the PED 400 is capable of sending information to its associated gambling machine, in this example, the PED is used simply as a display device. All communication to the gambling machine originates from the IS server 610. This arrangement simplifies PED 400 programming.

Also, since the PED 400 is located near the gambling machine so it is viewable by the gambler, there is always a risk of unauthorized access to the PED. A knowledgeable hacker might be able to make unauthorized changes to the PED programming and cause undesired results such as unauthorized payouts. By causing all messages to the gambling machine to originate at the IS server 610, and by locating the IS server in a secure location, such risk is greatly reduced. If circumstances require, some or all of the messages to a gambling machine could originate from the PED 400.

Figure 8A:
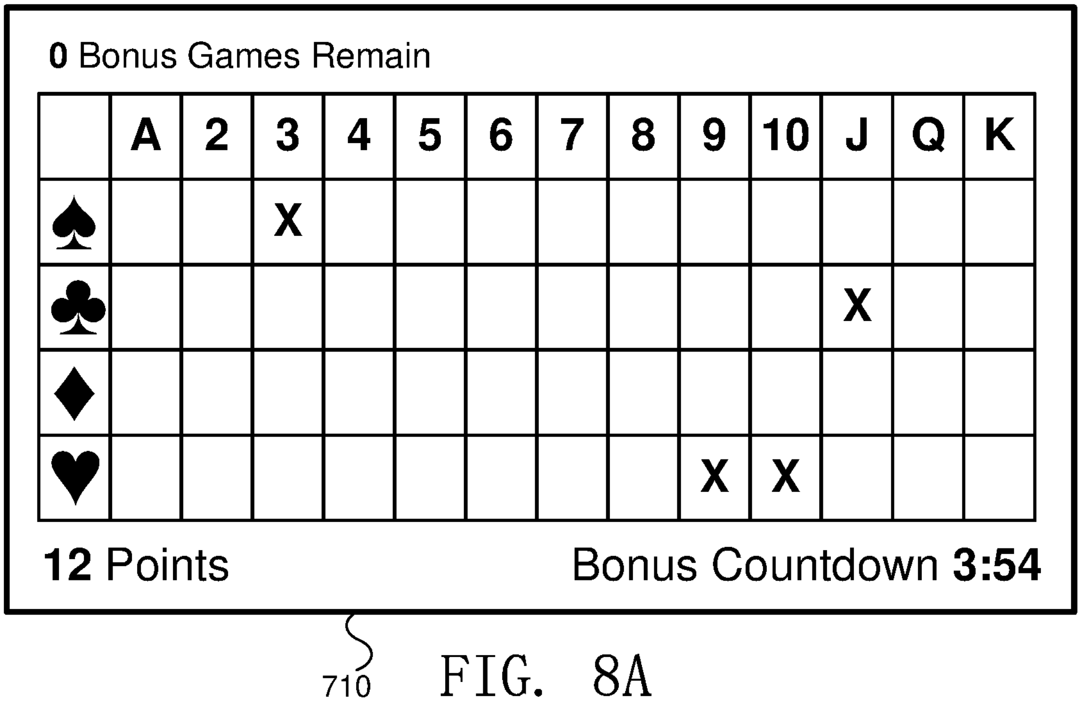
FIGS. 8A-8E are example screen diagrams illustrating operation of the personal electronic device during operation of a bonus, according to embodiments of the invention.

In this example, play has already occurred at the gambling machine but no game is currently underway. In this state, the PED 400 displays a summary screen 710 as depicted in FIG. 8A. In practice the summary screen 710 may be generated by the display processor 430 of FIG. 5 and displayed on the PED 400. The summary screen 710 displays bonus games remaining, points earned, countdown time until next bonus drawing and a chart showing entry cards acquired during the current round. In this example, accumulated entry cards are: 3 of spades, Jack of clubs, 5 of diamonds and 9 & 10 of hearts. This information was sent to the PED 400 from the IS server 610 at the end of the last game played, in the form of a status message, as will be described later.

When the gambler makes a new wager and presses deal, he is presented with a discard screen on the gambling machine. Simultaneously, a message describing the wager amount and deal hand is sent from the gambling machine to the IS server 610, which in turn sends a message to the PED 400 in the following example format:

D,3,1,2,JH,QD,3S,5S,7C,0,12,X

Where D indicates the discard screen is to be displayed, 3 indicates 3 points which can be earned. The next two data values 1,2, indicates cards 1 and 2 are eligible for the trade-in bonus and 3 indicates the total points awarded if the trade-in is made. If no trade-in bonus is available, these three values are sent as 0,0,0. Next are the dealt card values for each position 1-5, in order. JH, QD, 3S, 5S, 7C, meaning jack of hearts, queen of diamonds, 3 of spades, 5 of spades and 7 of clubs. 0 is bonus games remaining and 12 is point balance. The last value, X, indicates end of message.

In this embodiment, all messages are sent using ASCII values, thus the first message value, D, is sent as a single byte of hex value 044H. Of course, alternative message formats may be used. Some elements of this bonus game are linked to a number of gambling machines, and each has an associated PED 400. Each PED 400 is identified by a unique address, in this example the IP address of the PED is used. For clarity of explanation, the address mechanism is omitted from these examples. Those of skill in the art of gambling machine system design already understand how such addressing mechanisms function.

Figure 8B:
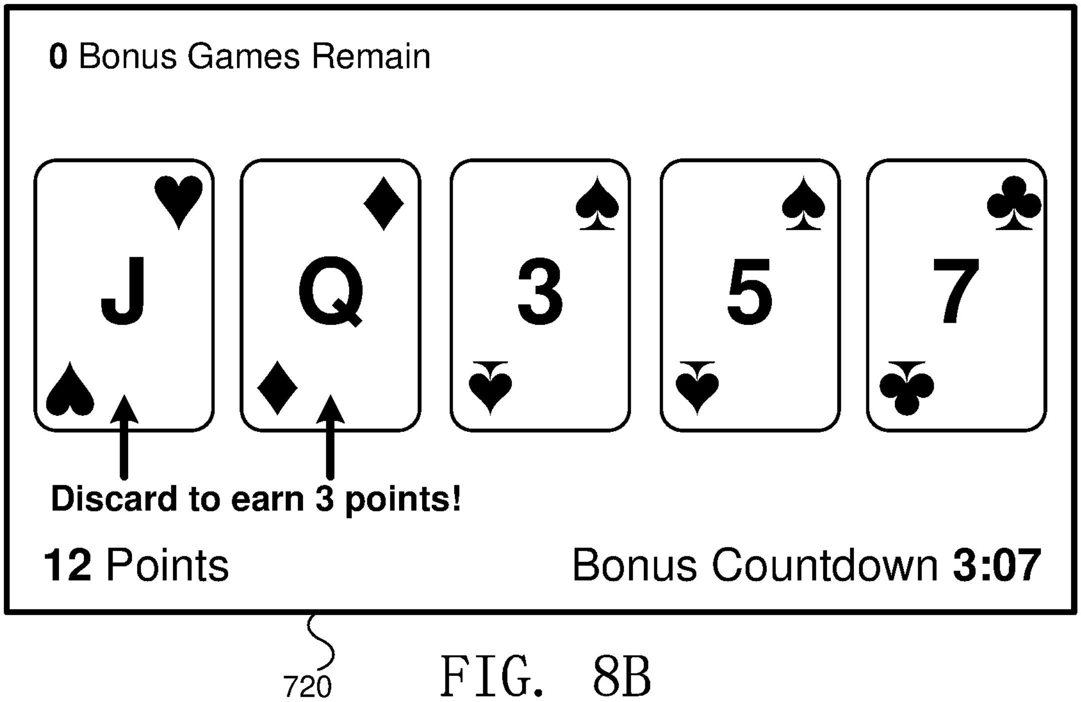

Using data from this message, the PED 400 displays the dealt cards but also shows the gambler which discards may be made to earn points. FIG. 8B depicts an example of a discard screen 720 using communicating this to the player. In this example, 3 credits were wagered and the cards dealt are Jack of hearts, Queen of diamonds, 3 of spades, 5 of spades and 7 of clubs. If the gambler discards the Jack of Hearts and Queen of Diamonds, he earns 1 point for every credit wagered, or 3 points total.

In this example the gambler discards the Jack of Hearts and Queen of Diamonds, and the gambling machine draws new cards to replace the discards, presents the final hand and pays any award that results. A message describing the game result, including final card values and amount paid is sent by the gambling machine to the IS server 610.

The IS server 610 then determines that an eligible discard was made and adds 3 points to the player's total bonus point value, bringing the total points value to 15. As that is enough to earn a new entry card, the IS server randomly selects a new entry card, in this case a 9 of diamonds, and sends an award message to the PED 400 as follows:

A,5D,X

The first value, A, indicates to the PED 400 that this is an Award message and an award screen should be displayed. 5D indicates the award card value and X indicates the end of message.

The PED 400 then presents an animated selection sequence (not shown) to indicate a new entry card was randomly selected and displays its value—in this case a 5 of diamonds.

Immediately after sending the just-described award message, the IS server 610 sends a status message to the PED in the format of:

S,3S,JC,5D,9H,10H,0,0,X

The first value, S, tells the PED 400 application to display the status screen. Next are values 3S, JC, 5D, 9H, 10H which represent entry cards 3 of Spades, Jack of Clubs, 5 of Diamonds, 9 of Hearts and 10 of hearts respectively. The next two values, 0, 0 indicate zero points have been earned (since all prior points were converted to a new entry card and 0 bonus games remain. The last value, X, indicates the end of message.

Figure 8C:
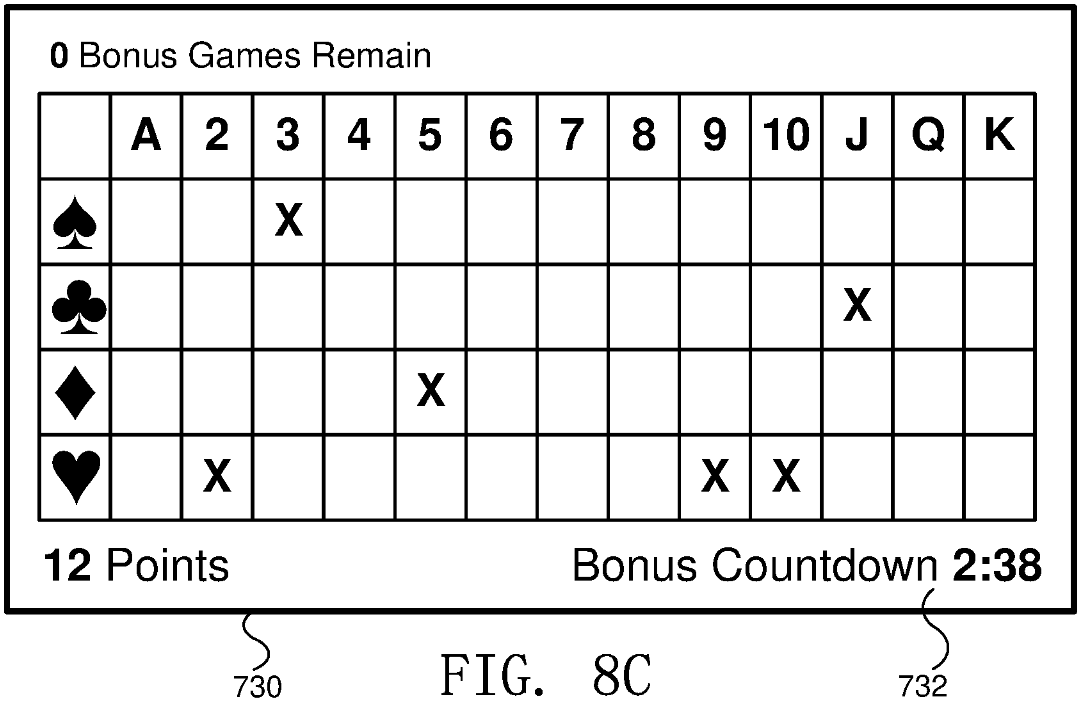

Based upon this message, the PED 400 displays a status screen 730 as illustrated in FIG. 8C. Note this is the same screen as FIG. 8A except the newest entry card, 5 of diamonds, is now represented.

The bonus countdown value, illustrated at 732, begins at 5 minutes and zero seconds, then counts down to 0 seconds, at which point a bonus game begins. The countdown value is broadcast by the IS server 610 to each attached PED 400 at regular intervals. In this example, the interval is once every minute, though other intervals may be used. The countdown value is updated by the application program with the PED at one second intervals.

When the bonus countdown reaches zero, a bonus game begins. The bonus game randomly selects a single card from a deck of 52 cards and is common to all connected gambling machines and associated PEDs.

Random selection of the bonus card is carried out by the IS server 610. Once the bonus card value is selected, the IS server 610 compares the entry cards assigned to each connected gambling game. The IS server 610 awards any game with an entry card that matches the selected bonus card a bonus award and clears all entry cards held by all games.

The countdown clock is reset to 5 minutes. Point balances remain unchanged and the bonus game process begins anew.

In this example, a bonus award entitles the gambler to 50 games in which any win of a straight, flush, straight flush or royal flush is doubled. The award process begins when the IS server sends an award message to a PED in the following format:

A, 50,X

Figure 8D:
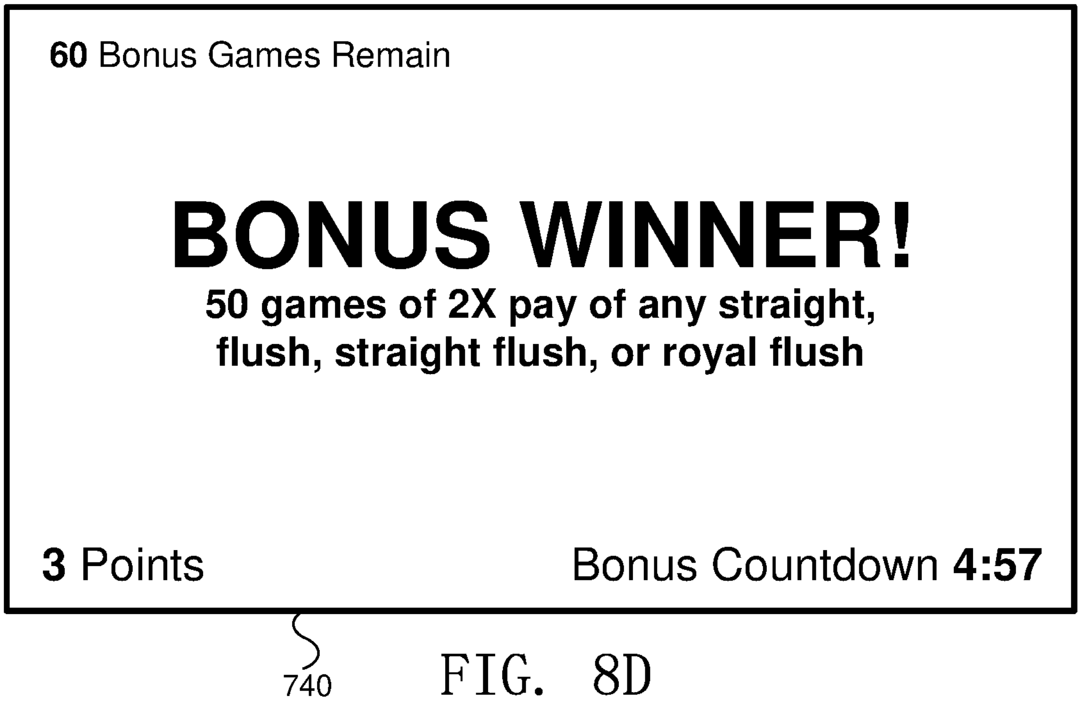

The first data value of "A" specifies an award message. The value 50 indicates 50 bonus games. X indicate end of message. Upon receipt of the award message, the PED 400 displays an award screen 740 as shown in FIG. 8D. The screen simply notifies the gambler that an award has occurred and reminds him of what the award is.

The award screen is displayed by the PED 400 for a fixed period of time, typically 5 seconds. During this time the IS server 610 sends a status message, which is displayed by the PED 400 as an updated status screen 750, as illustrated in FIG. 8E, when the award screen 740 expires.

Figure 8E:
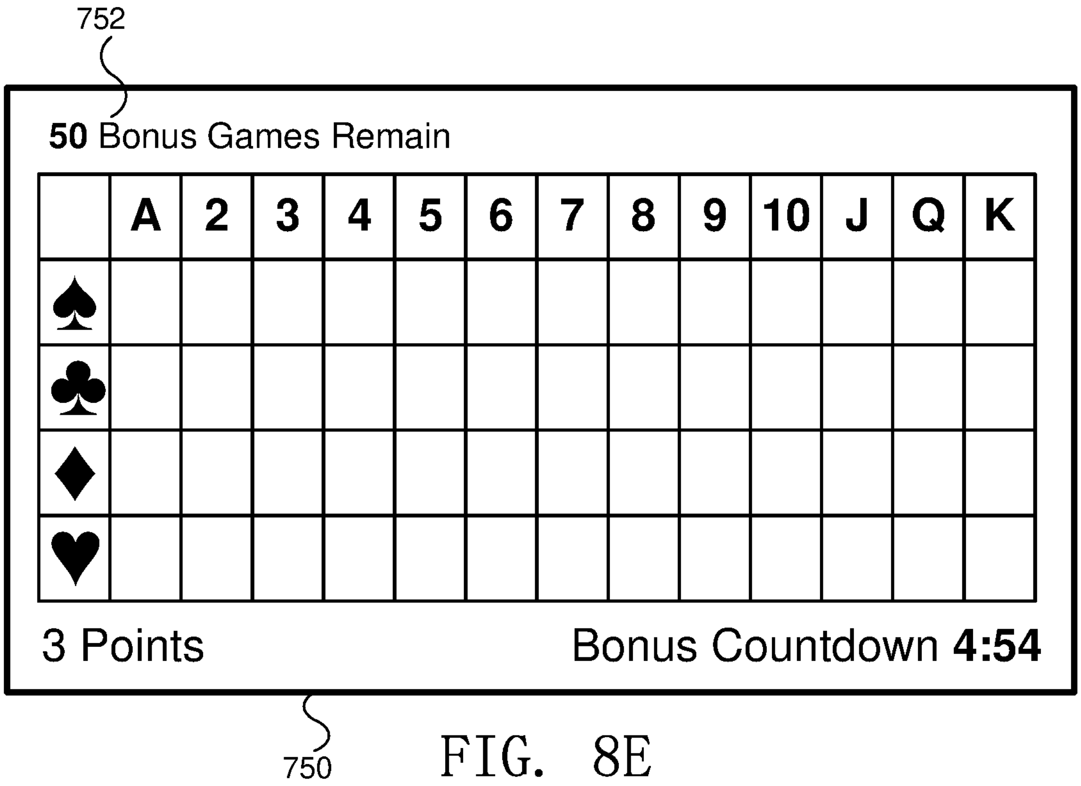

After each game play, a bonus games remaining counter, such as that illustrated in FIG. 8E as 752, is decremented. When a qualifying win occurs, it is detected by the IS server 610 from information sent by the gambling machine in the game results messages. When a qualifying award is detected, the IS server 610 sends a message to the gambling machine telling it to pay a specific amount to the player, over and above the amount paid by the gambling machine for the award. This amount is derived from the game results message received from the gambling machine. For example, a gambler wagers 5 credits and strikes a straight flush, which pays an award of 250 credits. This information is received by the IS server 610 in a game results message from the gambling machine. The IS server 610 determines the gambling machine is eligible for a bonus payment because bonus games remaining is >0. The IS server 610 then sends a message telling the gambling machine to pay 250 credits to its credit meter. Finally, the IS server decrements the bonus games remaining counter by 1.

Another role that a PED can play within a gaming system is that of a "jackpot detector" for a player. The term jackpot detector, as described in detail below, is a generic label for a function of the PED in which the PED "detects" gaming devices that meet pre-established criteria, and is not limited to only jackpot criteria, notwithstanding the label.

Figure 9:
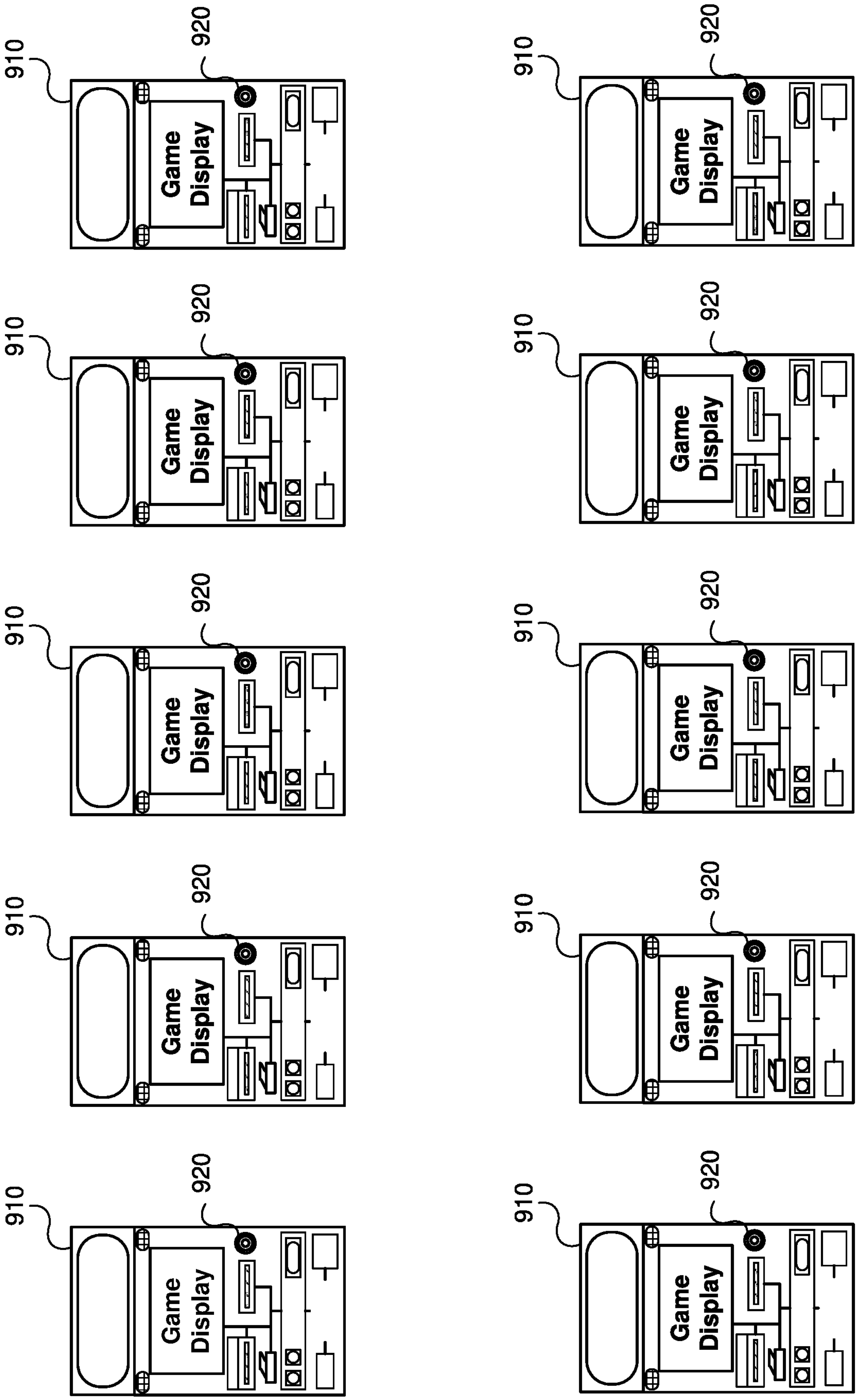
FIG. 9 is a block diagram of a bank of gaming devices each including a wireless communication port according to embodiments of the invention.

In one embodiment, each gaming device, such as the gaming devices 910 of FIG. 9 are each equipped with a communication port, such as a wireless communication port 920. In a preferred embodiment, the wireless communication port 920 may have limited range, for example less than 4-12 inches, so as to not interfere with a wireless communication port of any other gaming device.

In practice, the communication port may use the well-known Bluetooth wireless protocol. A low-power class of Bluetooth transceiver has a maximum range of approximately 1 meter, which may be further attenuated by directional antennas or other mechanisms to reduce the effective range of the wireless communication port 920. In practice, the wireless communication port 920 may be installed directly on and controlled by the gaming device 910, or may instead be driven by an attached MID 20 (FIG. 1). Specifically, as illustrated in FIG. 3A, the wireless communication port may communicate directly with the TWI interface within the physical port 240 of a SAS processor 210 coupled to the gaming device 910. Other example wireless communication methods can include use of the well-known Zigbee protocol, as well as near field magnetic field communication, for instance.

In another embodiment, a PED 400 itself may be mounted to the gaming device 910, and a wireless transceiver on the PED 400 may function as both a secondary (or tertiary) display and as the wireless communication port 920. For instance, the radio 480 of PED 400 (FIG. 5) may provide the communication port to another PED carried by a player. As described above, the MID 20 may, in fact, drive the radio 480 of the PED 400 from the MID 20.

Figure 10A:
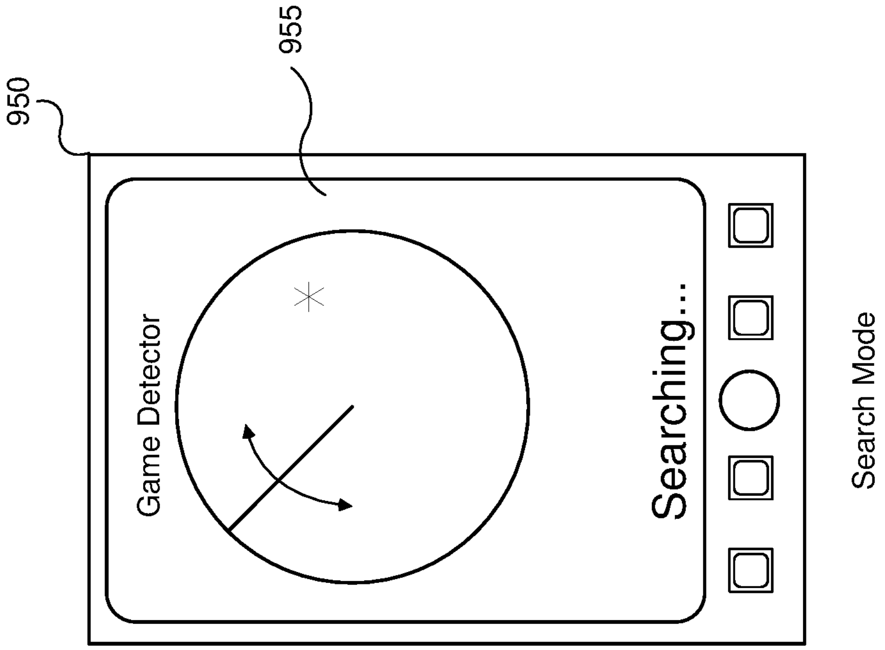
FIGS. 10A and 10B are example screen views of a PED in detection mode and detected modes, respectively, according to embodiments of the invention.
Figure 10B:
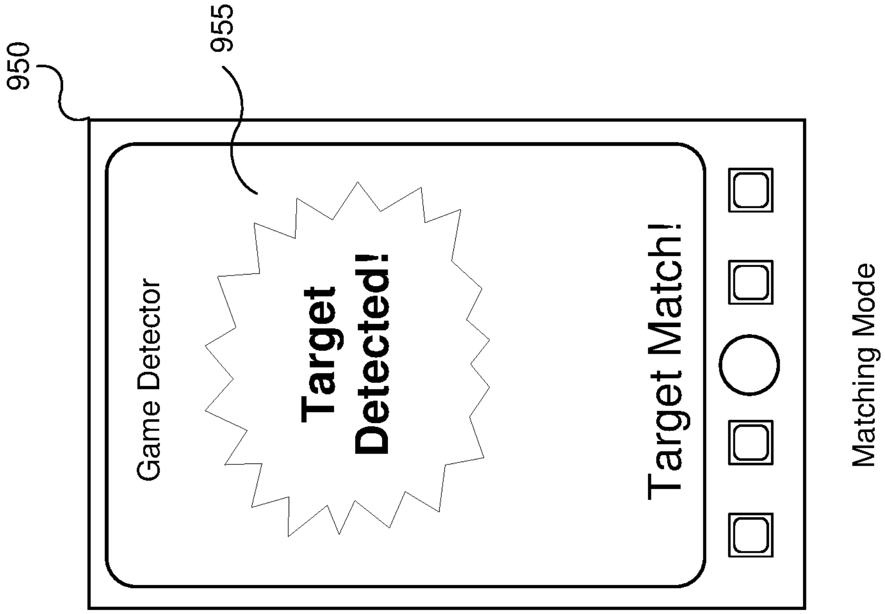

In practice, a player hoping to seek an advantage moves around a casino floor with a PED 950, of FIG. 10A, which may be an implementation of the PED 400 of FIG. 5. The PED 950 runs a program, jackpot detector that drives several components of the PED. One component is a wireless transceiver, which is used to communicate with the wireless communication port 920 of one or more gaming devices 910. Another component of the PED 950 driven by the jackpot detector program is a PED screen 955, illustrated in FIGS. 10A and 10B. The jackpot detector program on the PED 950 helps the player select a particular gaming device 910 out of all the gaming devices on the casino floor.

A player walks the casino floor with the jackpot detector running on the PED 950 set to "look" for gaming devices 910 that match desired criteria. A PED 950 in such a "search" mode is illustrated in FIG. 10A. Criteria may be pre-determined or configured by the player. Common measurements for specific criteria include number of games or time elapsed. Common criteria include jackpots won, major awards won, consecutive wins or losses, etc. Combining the criteria with the measurement, a player can select to be notified, by the jackpot detector running on the PED 950 about particular gaming machines that have one or more qualities sought by the player, such as:

More/fewer than "n" games since a Jackpot has been won

Longer than/shorter than "x" time since a Jackpot has been won

More/fewer than "n" games since a particular major award won

Longer than/shorter than "x" time since a particular major award won

More/fewer than "n" successive wins over/under threshold "x"

Longer than/shorter than "y" time since "n" successive wins over/under threshold "x."

The player carries the PED 950 and places it near the wireless communication port 920 of a particular gaming device 910. In one example, the jackpot detector program running on the PED 950 generates a screen 955 that indicates to the player if the particular gaming device 910 satisfies the selected criteria. For example, as the player points the PED 950 at the gaming device, or moves it near the wireless communication point 920, an indicator on the screen 955 lights momentarily and generates a scanning effect, as illustrated in FIG. 10A. If the game does not match the desired criteria nothing more happens, which indicates that the gaming device 910 does not match the desired criteria. Instead, if the game matches the desired criteria, the scanning effect stops, and the screen 955 changes appearance, such as makes a bright light and particular sound effect to indicate to the player that the gaming device 910 matches the criteria. An example of the screen 955 in matched mode is illustrated as FIG. 10B.

As the player is searching for a particular game, the player waves or places the PED 950 near various gaming devices 910, moving from machine to machine, until the criteria is satisfied and the detector program triggers. Because of the limited signal distance, as described above, the PED 950 accurately identifies the particular gaming device 910 that has the criteria that matches the criteria selected by, or used by, the player.

As an additional incentive to encourage a player to use a jackpot detector application on the PED 950, a gaming system may provide a "guarantee" to a player who selects a particular gaming device 910 based on the jackpot detector. For example, the system can guarantee a minimum set of benefits, such as 100 player loyalty points, or $5.00 in free credit, or guarantee a jackpot of a certain amount provided a minimum wagering amount is made by the player. In practice, some of the "guaranteed" rewards may, in fact, naturally occur due to the paytable of the gaming device itself, so there is no additional cost to the casino for the guarantee. Thus, some "guarantees" may be made with the particular paytables of the gaming devices in mind.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

What is claimed is:

1. A method comprising:

linking an electronic gaming device to a user device, wherein the user device comprises one or more location sensors;

initiating a game on the electronic gaming device;

determining an outcome of the game is associated with an award;

receiving, from the user device, location data associated with the one or more location sensors;

determining, based on the location data, the user device is located in a qualifying location; and outputting, via the electronic gaming device, based on the award, and only if the user device is in the qualifying location, an award message.

2. The method of claim 1, wherein the electronic gaming device is configured to execute one or more wagering games.

3. The method of claim 1, wherein the user device comprises a smart phone and wherein the location data associated with the one or more location sensors comprises one or more of device proximity data, low power communication connection data, global positioning system (GPS) data, wifi connection data, or cellular connection data.

4. The method of claim 1, wherein determining the user device is in the qualifying location comprises determining the user device is within a threshold distance from the electronic gaming device.

5. The method of claim 1, further comprising:

determining one or more identifiers associated with the user device;

determining, based on the one or more identifiers associated with the user device, a user account; and transferring, to the user account, one or more credits.

6. The method of claim 1, further comprising:

determining, based on a location of the user device, one or more trade opportunities associated with the game; and receiving from the user device, a user input configured to execute the one or more trade opportunities associated with the game.

7. The method of claim 6, further comprising:

determining, based on the one or more trade opportunities, one or more bonus awards; and outputting the one or more bonus awards.

8. One or more non-transitory computer-readable media storing processor-executable instructions thereon, which, when executed by at least one processor cause the at least one processor to:

link an electronic gaming device to a user device, wherein the user device comprises one or more location sensors;

initiate a game on the electronic gaming device;

determine an outcome of the game is associated with an award;

receive, from the user device, location data associated with the one or more location sensors;

determine, based on the location data, the user device is located in a qualifying location; and output, via the electronic gaming device, based on the award, and only if the user device is in the qualifying location, an award message.

9. The one or more non-transitory computer-readable media of claim 8, wherein the electronic gaming device is configured to execute one or more wagering games.

10. The one or more non-transitory computer-readable media of claim 8, wherein the user device comprises a smart phone and wherein the location data associated with the one or more location sensors comprises one or more of device proximity data, low power communication connection data, global positioning system (GPS) data, wifi connection data, or cell tower connection data.

11. The one or more non-transitory computer-readable media of claim 8, wherein the processor-executable instructions, that when executed by the at least one processor, cause the at least one processor to determine the user device is in the qualifying location, further cause the at least one processor to determine the user device is within a threshold distance from the electronic gaming device.

12. The one or more non-transitory computer-readable media of claim 8, wherein the processor-executable instructions, when executed by the at least one processor, further cause the at least one processor to:

determine one or more identifiers associated with the user device;

determine, based on the one or more identifiers associated with the user device, a user account; and transfer, to the user account, one or more credits.

13. The one or more non-transitory computer-readable media of claim 8, wherein the processor-executable instructions, when executed by the at least one processor, further cause the at least one processor to:

determine, based on a location of the user device, one or more trade opportunities associated with the game; and receive from the user device, a user input configured to execute the one or more trade opportunities associated with the game.

14. The one or more non-transitory computer-readable media of claim 13, wherein the processor-executable instructions, when executed by the at least one processor, further cause the at least one processor to:

determine, based on the one or more trade opportunities, one or more bonus awards; and output the one or more bonus awards.

15. An apparatus comprising:

one or more processors; and memory storing processor-executable instruction that, when executed by the one or more processors, cause the apparatus to:

link an electronic gaming device to a user device, wherein the user device comprises one or more location sensors;

initiate a game on the electronic gaming device;

determine an outcome of the game is associated with an award;

receive, from the user device, location data associated with the one or more location sensors;

determine, based on the location data, the user device is located in a qualifying location; and output, via the electronic gaming device, based on the award, and only if the user device is in the qualifying location, an award message.

16. The apparatus of claim 15, wherein the electronic gaming device is configured to execute one or more wagering games.

17. The apparatus of claim 15, wherein the user device comprises a smart phone and wherein the location data associated with the one or more location sensors comprises one or more of device proximity data, low power communication connection data, global positioning system (GPS) data, wifi connection data, or cell tower connection data.

18. The apparatus of claim 15, wherein the processor-executable instructions, that when executed by the one or more processors, cause the one or more processors to determine the user device is in the qualifying location, further cause the apparatus to determine the user device is within a threshold distance from the electronic gaming device.

19. The apparatus of claim 15, wherein the processor-executable instructions, when executed by the one or more processors, further cause the apparatus to:

determine one or more identifiers associated with the user device;

determine, based on the one or more identifiers associated with the user device, a user account; and transfer, to the user account, one or more credits.

20. The apparatus of claim 15, wherein the processor-executable instructions, when executed by the one or more processors, further cause the apparatus to:

determine, based on a location of the user device, one or more trade opportunities associated with the game; and receive from the user device, a user input configured to execute the one or more trade opportunities associated with the game.

* * * * *